United States Patent
Yoshifusa et al.

(10) Patent No.: US 9,700,161 B2
(45) Date of Patent: Jul. 11, 2017

(54) EXHAUST VALVE APPARATUS AND GAS FILLED CUSHION

(71) Applicants: Katsutoshi Yoshifusa, Tokyo (JP); Hirotaka Yoshifusa, Tokyo (JP); G.E.S. Co., Ltd., Tokyo (JP); Lee-Jin Park, Seoul (KR)

(72) Inventors: Katsutoshi Yoshifusa, Tokyo (JP); Hirotaka Yoshifusa, Tokyo (JP); Lee-Jin Park, Seoul (KR)

(73) Assignees: Katsutoshi Yoshifusa, Tokyo (JP); Hirotaka Yoshifusa, Tokyo (JP); G.E.S. CO., LTD., Tokyo (JP); Lee-Jin Park, Seoul (KR)

( * ) Notice: Subject to any disclaimer, the term of this patent is extended or adjusted under 35 U.S.C. 154(b) by 0 days.

(21) Appl. No.: 14/842,167

(22) Filed: Sep. 1, 2015

(65) Prior Publication Data

US 2016/0058218 A1 Mar. 3, 2016

(30) Foreign Application Priority Data

Sep. 1, 2014 (JP) ................................. 2014-177527

(51) Int. Cl.
*A47G 9/10* (2006.01)
*A47G 9/08* (2006.01)
*A47C 27/08* (2006.01)

(52) U.S. Cl.
CPC .......... *A47G 9/1027* (2013.01); *A47C 27/081* (2013.01); *A47G 9/08* (2013.01)

(58) Field of Classification Search
CPC ....... A47C 27/08; A47C 27/081; A47C 27/10; A47G 9/08; A47G 9/10; A47G 9/1027;
(Continued)

(56) References Cited

U.S. PATENT DOCUMENTS 7,165,677 B2 * 1/2007 Tanaka ................. B65D 81/052
206/522
7,913,848 B2 * 3/2011 Liao ..................... B65D 81/052
206/522

(Continued)

FOREIGN PATENT DOCUMENTS

JP 2004307058 A * 11/2004
JP 2005-509568 A 4/2005
(Continued)

*Primary Examiner* — Bryon Gehman
(74) *Attorney, Agent, or Firm* — The PL Law Group, PLLC

(57) ABSTRACT

A gas cushioning material preserved by easily discharging a gas from a bag part and used by filling the bag part with the gas when used again is provided. Gas cells are disposed in parallel in a gas cell row by forming heat-fusion parts in the transverse direction. A discharge valve part for discharging gas is formed at an end portion of each gas cell row. A narrowed discharge passage is formed in the discharge valve part. When the bag part is filled with a gas, the discharge valve part is bent to close the discharge passage, and in the state in which the discharge valve part is bent, a first surface fastener and a second surface fastener formed on a front surface and a rear surface of the discharge valve part are coupled to each other to maintain a closed state of the discharge passage.

4 Claims, 21 Drawing Sheets

(58) Field of Classification Search
CPC ... B65D 81/05052; B65D 81/05; B65D 81/052; F16K 24/04; F16K 31/44
USPC .............................. 137/223; 206/522; 383/3
See application file for complete search history.

(56) References Cited

U.S. PATENT DOCUMENTS

| | | | | |
|---|---|---|---|---|
| 8,371,446 B2* | 2/2013 | Tschantz | ............. | B65D 81/052 206/522 |
| 2014/0346079 A1* | 11/2014 | Gess | ................... | B65D 81/052 206/522 |

FOREIGN PATENT DOCUMENTS

| | | | | |
|---|---|---|---|---|
| JP | WO 2008038330 A1 * | 4/2008 | ............. | B65D 33/01 |
| JP | WO 2014069209 A1 * | 5/2014 | ........... | B65D 81/052 |
| WO | 2014/069209 A | 5/2014 | | |

* cited by examiner

FIG. 4
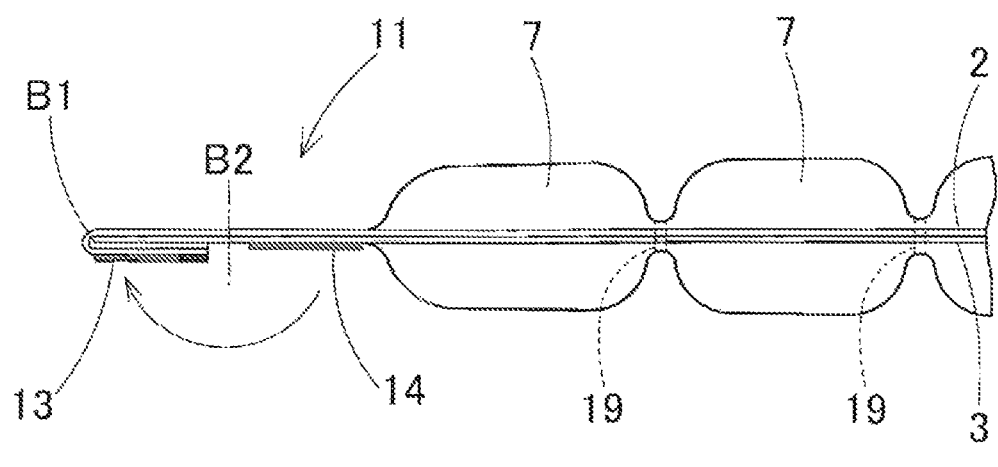
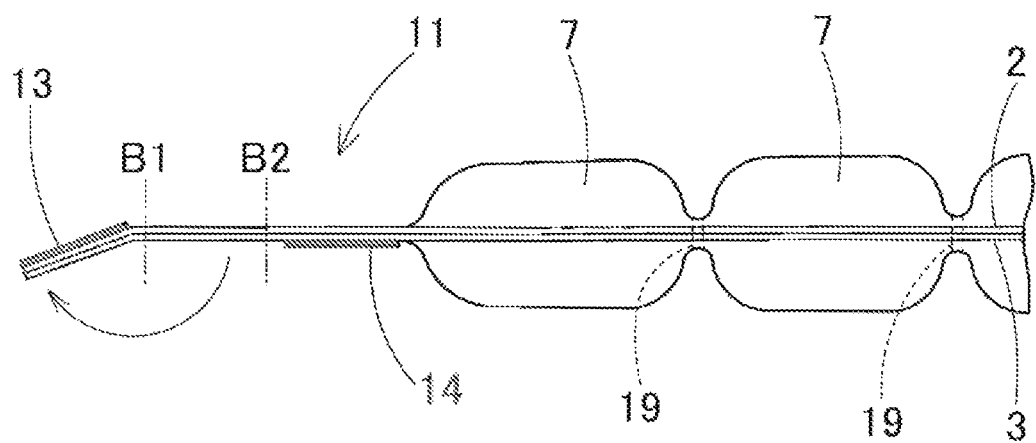

FIG. 7
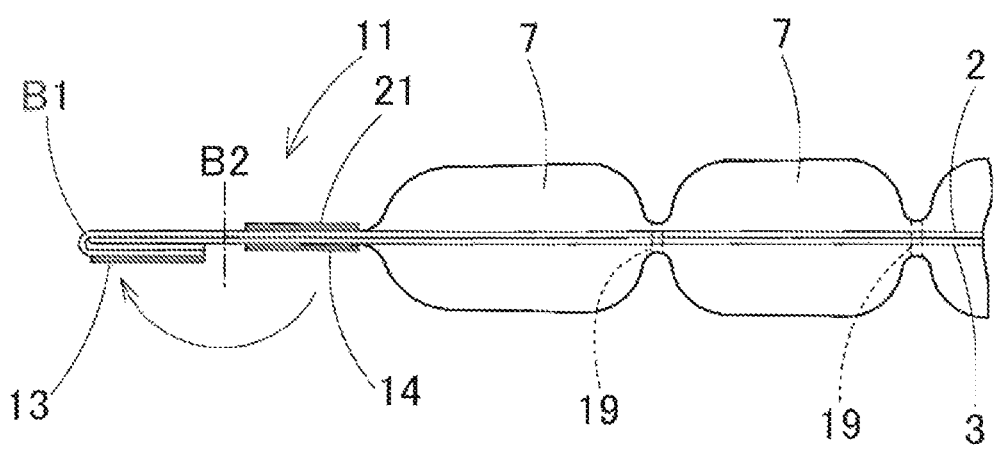
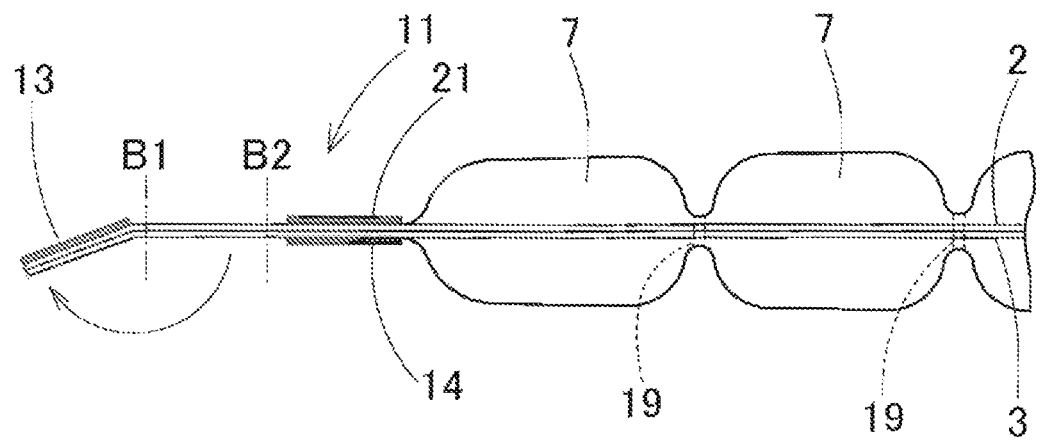

EXHAUST VALVE APPARATUS AND GAS FILLED CUSHION

CROSS-REFERENCE TO RELATED APPLICATION

This application claims priority to and the benefit of Japanese Patent Application No. 2014-177527, filed on Sep. 1, 2014, the disclosure of which is incorporated herein by reference in its entirety.

BACKGROUND

1. Field of the Invention

The present invention relates to a discharge valve device having a structure in which a discharge valve part is formed at one end of a bag part made of a film for discharging a gas with which the bag part is filled, the discharge valve part is bent to block a flow of the gas and the discharge valve part is opened to discharge the gas, and relates to a gas cushioning material which is used as a gas cell type cushioning material utilizing the above discharge valve part for an air mat, an air sitting mat, an air pillow and a bale-package material and which can be used as a sleeping bag, an article against the cold, a simplified tent, a simplified awning, and which can be preserved by easily discharging the gas from a gas cell after used and can be conveniently used by filling the gas cell with the gas when used again.

2. Discussion of Related Art

Hitherto, an air injection type air cell cushioning material has been known as a packing material having a cushioning function caused by air. This air injection type air cell cushioning material has the structure in which two films are heat-sealed, a plurality of air cells are in communication with each other and a simple air inlet is formed at an end portion. Usually, after air is injected through the inlet of this end portion, the inlet is heat-sealed.

In the step in which the user uses the air cell cushioning material, due to the above, if the user injects air into the air cell cushioning material by himself or herself, since there is a need to purchase an air injector on which heat seal equipment is formed and the air injector provided with the heat seal equipment has a relatively large size, it is difficult for an ordinary user to conveniently use an air cell cushioning material.

Here, a check valve (for example, see Japanese patent application laid-open publication No. 2005-509568) having a simple structure is mounted to an air injection type air cell cushioning material, and the air cell is filled with air by a simple air pump to utilize the air cell cushioning material. In this air injection type air cell cushioning material, an intermediate film is inserted into an end portion of a cushioning main body formed by overlapping two films, an inclined passage and a check valve part are formed in the cushioning main body, and a gas is injected into each air cell through this check valve part. Consequently, this air injection type air cell cushioning material is used as a cushioning material.

Basically, in this air injection type air cell cushioning material, after the check valve part is mounted to some of the air cells which have a closed periphery, and air is injected into the air cell through the check valve part to fill the air cell with air, air cannot be discharged from the air cell.

Due to the above, after the air cell cushioning material is utilized for bale-packaging the goods, in a case in which the user discharges air from the air cell to preserve the cushioning material while a volume is reduced, the air cell should be broken in order to discharge air from the air cell. Consequently, the air cell cushioning material cannot be filled with air and used again.

In addition, if the air cell cushioning material is used again after used once, the air cell cushioning material is preserved in a state in which the air cell is filled with air and is then used again. Therefore, the air cell cushioning material which is fully filled with air will inevitably have a large volume, and as a result, a large space should be required for preserving the air cell cushioning material.

Because of the above, after the air cell cushioning material is used for bale-packaging the goods, the film constituting the air cell is generally broken and then discarded, and after using the air cell cushioning material for bale-packaging the goods, the user discharges air from the air cell to reduce a volume of the air cell cushioning material and then to preserve it. In the case in which the user uses air cell cushioning material again, it is impossible to perform the above procedure.

Here, the present applicant has proposed the air cushioning material formed of a film and disclosed in PCT International Publication No. WO2014/069209, in which air can be easily discharged from a bag part to preserve the air cushioning material and the bag part can be filled with air to allow the air cushioning material to be conveniently used again. In this air cushioning material, a discharge valve part having a narrowed discharge passage is formed at a portion of a bag part to discharge air from the bag part formed of a film, the discharge valve part is bent and the discharge part is adhered by an adhesive layer formed on a surface of the bag part to close the discharge passage when the bag part is filled with air, and the adhesive layer is detached to open the discharge passage when air is discharged from the bag part.

By detaching the adhesive layer to open the discharge valve part, the air is discharged from the bag part and such an air cushioning material may be preserved and used again. However, if oil, moisture or a foreign substance is contained in the adhesive layer, coupling of the discharge valve part is insufficient so that it is difficult to use the air cushioning material again.

SUMMARY

The present invention is invented to solve the above problems, and an object of the present invention is to provide a discharge valve device in which a discharge valve part is bent to block a flow of a gas and the discharge valve part is opened to allow the gas to be easily discharged. In addition, another object of the present invention is to provide a gas cushioning material in which a discharge valve part is opened to easily discharge the gas from a bag part and the bag part can be filled with the gas to enable the gas cushioning material to be easily used again.

The discharge valve device according to the present invention having a discharge valve part is formed at one end of a bag part formed of a film and is configured to discharge a gas filling the bag part, the discharge valve part is bent to block a flow of the gas and is opened to discharge the gas, the discharge valve part is coupled and closed in a bent state by a surface fastener, the surface fastener is detached, and the discharge valve part is opened to discharge the gas in the bag part.

Furthermore, a gas cushioning material according to the present invention includes a gas introducing passage a gas formed at one end of a bag part formed of a film for introducing, a plurality of gas injecting check valves connected to each portion of the gas introducing passage and a plurality of gas cell rows installed in parallel in the bag part, the gas cell row being filled with the gas supplied from the gas introducing passage through each of the gas injecting check valves, wherein heat-fusion lines are formed in a transverse direction at a predetermined interval in the gas cell row so that a plurality of gas cells are disposed side by side in the gas cell row in a longitudinal direction of the gas cell row and the plurality of gas cells in the gas cell row communicate with each other through a communicating passage; a discharge valve part for discharging the gas from the gas cell row is formed at an end portion of each gas cell row, which is opposite to a portion at which the gas injecting check valve is formed, and a narrowed discharge passage is formed in the discharge valve part; and when the bag part is filled with the gas, the discharge valve part is bent and the discharge valve part is coupled in a bent state by a surface fastener formed on a surface of the bag part to close the discharge passage, and when the gas is discharged from each gas cell row, the surface fastener formed at an end portion of each gas cell row is detached to open the discharge valve part.

Here, a use of the gas cushioning material may be, by way of example, an air mat, an air pillow, an air sitting mat, a gas cell cushioning material, a sleeping bag, an article against the cold, a simplified tent, a simplified awning etc. Apart from the bag part formed of a synthetic resin film, in addition, the concept of the bag part made of the film includes the bag part made of a synthetic resin sheet which is relatively thin and can be bent and heat-sealed.

According to the gas cushioning material of the present invention, when used, the discharge valve part is bent and coupled by the surface fastener, and in a state in which the discharge passage of the discharge valve part is closed, the gas from the gas injector is injected into the bag part through the gas injection check valve and the gas cushioning material having the bag part filled with the gas is then used.

And, when the gas cushioning material is preserved after used, the surface fastener of the discharge valve part is detached and the gas in each gas cell row of the bag part is discharged through the discharge passage and the gas cushioning material having a reduced volume is then preserved, thereby it is possible to store the gas cushioning material in a small space.

In addition, when the gas cushioning material is used again, the discharge valve part is bent again and the surface fastener is coupled to close the discharge valve part, and in a state in which the discharge passage of the discharge valve part is closed, the gas is injected into the bag part through the gas injection check valve and the gas cushioning material having the bag part filled with the gas can be conveniently used again. Even though contaminants such as oil or moisture are attached to the surface fastener, coupling performance of the surface fastener is not degraded. Even under poor conditions such as a wet condition or a contaminated condition, therefore, filling and discharging of the gas can be performed repeatedly and the gas cushioning material can be used for a long time.

In addition, when the bag part is filled with the gas, the gas with uniform pressure is injected into the gas cells of all the gas cell rows. However, when the gas is discharged from the bag part, since the surface fastener of the discharge valve part of an arbitrary gas cell row is detached to allow the gas to be discharged, when the air cushioning material is used as, for example, an air mat, an air sitting mat, etc., the gas pressure can be optionally adjusted so that a gas pressure in the gas cell low disposed at a periphery is increased and a gas pressure in the gas cell low disposed at a central portion is lowered, thereby it is possible to provide the user with the air cushioning material having good usability.

Here, in the gas cushioning material, it is preferable that the surface fastener include a first surface fastener and a second surface fastener, the first surface fastener be attached to a surface of an edge of the discharge valve part, the second surface fastener be attached to an opposite surface of a portion, which is spaced apart from a front end portion, of the discharge valve part, and the discharge valve part is bent by 2 degree so that the first surface fastener of the discharge valve part is inverted by 2 degree, thereby the discharge passage of the discharge valve part is closed. According to the above structure, when closed, the discharge valve is assuredly closed and it is possible to maintain the gas pressure in the gas cell for a long time.

In addition, in the gas cushioning material, it is preferable that a slit be formed between the gas cell rows of the discharge valve part to separate the discharge valve part of each gas cell row and the surface fastener be attached to the discharge valve part of each gas cell row. According to the above, when the discharge valve part of each gas cell row is closed, the valve is closed by easily bending the discharge valve part of the arbitrary gas cell row and the discharge valve part of the an arbitrary gas cell can be opened by extending a bending of the discharge valve part.

Also, in the gas cushioning material, the discharge valve part has a third surface fastener attached thereto, and the plurality of gas cushioning materials may be connected to each other by the third surface fastener of the discharge valve part and then used.

In addition, in the gas cushioning material, the bag part has a fourth surface fastener attached to a side edge of the gas cell row thereof, and the plurality of gas cushioning materials may be connected to each other by the fourth surface fastener attached to the side edge of the gas cell row and then used.

According to the above, when the gas cushioning material is manufactured, the small-sized gas cushioning material may be chiefly produced by a compact manufacturing facility, and when using the gas cushioning material, the user can connect an optional number of the gas cushioning materials to each other to obtain the gas cushioning material having a desired dimension and use it according to a purpose.

In addition, when the gas cushioning material has a proper-sized square plate shape, the plurality of gas cushioning materials are connected to each other to have an optional shape. When the connected gas cushioning materials have a bag shape, a sleeping bag or an article against the cold can be formed using it, and when the connected gas cushioning materials have a tent shape, a simplified tent or a simplified awning can be formed using it.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 4 is a schematic partial side view showing a state in which a bent discharge valve part is opened;

FIG. 7 is an enlarged cross-sectional view of a discharge valve part of a gas cushioning material according to another embodiment;

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 3:
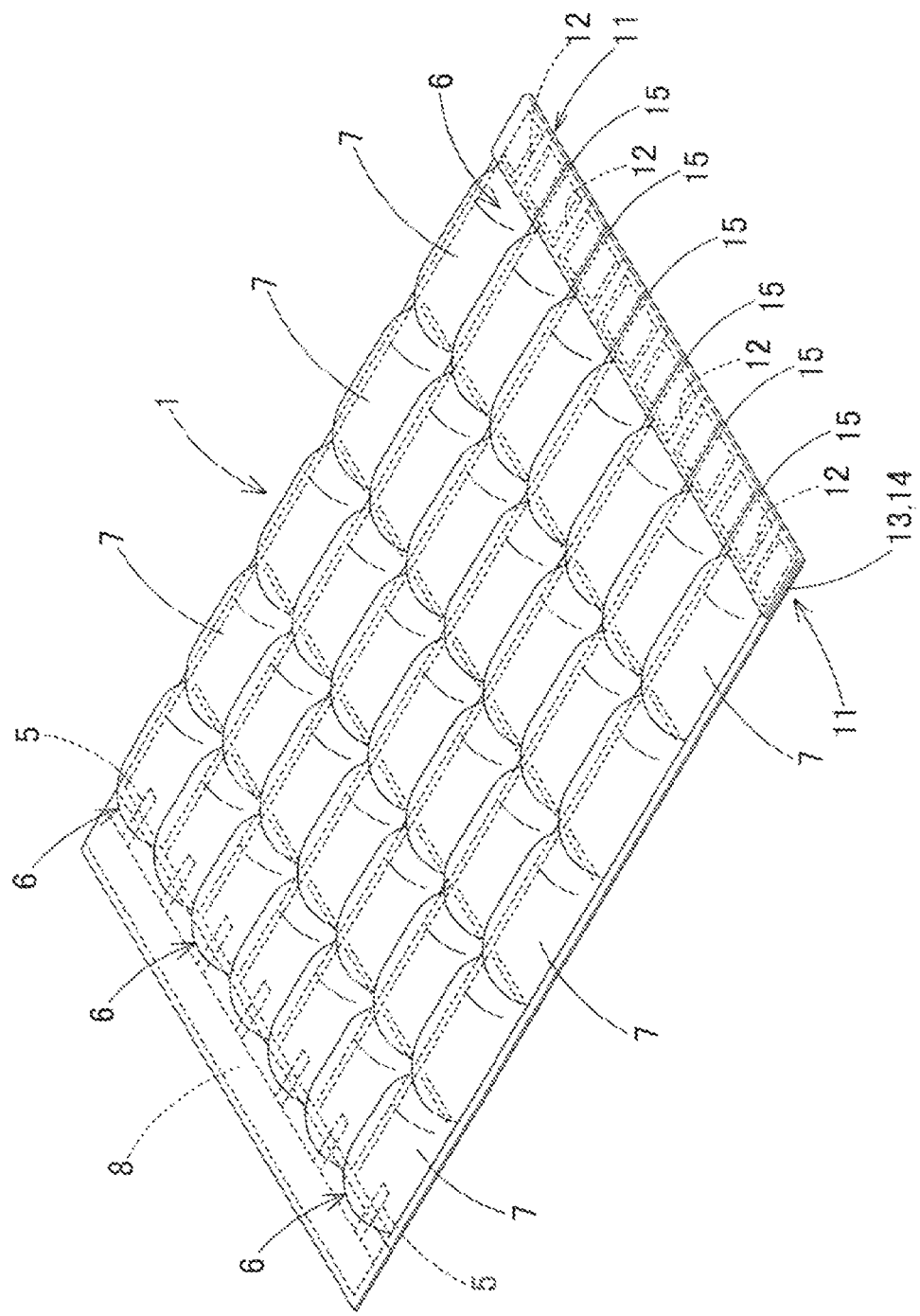
FIG. 3 is a perspective view of a gas cushioning material.

A gas cushioning material 1 according to the first embodiment shown in FIG. 1 to FIG. 6 is a gas cushioning material employed as an air mat, an air sitting mat or a gas cell cushioning material for bale-packaging the goods. As shown in FIG. 3, the gas cushioning material 1 is formed in a mat shape by a bag part 4 made of a film, a plurality of gas cell rows 6 are arranged in parallel with the bag part 4, and a plurality of gas cells 7 are disposed side by side on each of the gas cell rows 6 in a longitudinal direction thereof. In addition, a gas introducing passage 8 and a gas injecting check valve 5 are formed at an upper portion of each bag part 4.

In the gas cushioning material 1, a first film 2 and a second film 3 overlap each other and peripheral portions of the films are heat-fused with a heat-fusion line 18 to form the bag part 4 in a bag shape. And, the gas introducing passage 8 is formed at an upper portion of the gas cushioning material 1 in a transverse direction, and a plurality of the gas cell rows 6 extend from the gas introducing passage 8 in a longitudinal direction, that is, a perpendicular direction. Each gas cell row 6 is connected to and communicates with the gas introducing passage 8 via the gas injecting check valve 5, and a gas (air, nitrogen, etc.) introduced from the gas introducing passage 8 is injected into the gas cell row 6 through the gas injecting check valve 5 to fill each gas cell row.

In other words, in the gas cushioning material 1, the first film 2 and the second film 3, which are cut in a rectangular shape and have a predetermined size, overlap each other and linear-shaped heat-fusion lines 18 are formed at the peripheral portions and at predetermined locations of inner areas of the films by heat-sealing to form the plurality of gas cell rows 6 in a longitudinal direction. Heat-fusion parts 19 are formed in each gas cell row 6 in the transverse direction at a predetermined interval. Due to the above, the gas cell row is divided into the plurality of gas cells 7. Communicating passages 7a, which are non-fused portions, are formed at both end portions of the heat-fusion part 19, the gas injected via the gas introducing passage 8 enters the gas cell row 6 via the gas injecting check valve 5 and is then injected into each gas cell 7 in order via the communicating passages 7a. A discharge valve part 11 is formed at a lower end portion of the bag part 4, that is, a lower end portion of each gas cell row 6.

A one layered plastic film may be employed as the first film 2 and the second film 3. In view of a gas barrier or heat-sealability, however, it is preferable to utilize a functional film having two or more layers. For example, in the case in which a two-layered plastic film is employed as the first film 2 and the second film 3, nylon having the gas barrier may be utilized as the outer layer and linear low density polyethylene (LLDPE) may be used as the inner layer. In addition, in the case in which a three-layered plastic film is used, using LLDPE as the outer layer and nylon as the inner layer, it is possible to heat-fuse the first film 2 and the second film 3 and to perform heat-fusing in a state in which the heat-fused first film 2 and the second film 3 are additionally inserted.

If the gas cushioning material 1 is used as a gas cushioning material for bale-packing the goods, a plastic film with a thickness of approximately 20 μm to approximately 300 μm may be used as the first film 2, the second film 3 and a film for a valve. However, if the gas cushioning material 1 is used as an air mat, an air sitting cushion, etc., a thicker plastic sheet can also be utilized.

In addition, if the gas cushioning material 1 is used as the air mat, the air sitting cushion, etc., an aluminum deposition film obtained by depositing aluminum may be employed as at least one of the first film 2 and the second film 3. In this case, since the aluminum deposition film serves to block cold air or heat or reflect heat rays, if the gas cushioning material is used as the air mat in summer, the gas cushioning material 1 is used in a state in which the aluminum deposition film is disposed at an upper side.

In this way, a user may use the gas cushioning material 1 as the air mat in a cooler state. Meanwhile, if the gas cushioning material is used as the air mat in winter, the gas cushioning material 1 is used in a state in which a transparent film is disposed at an upper side and the aluminum deposition film is used as a lower side. In this way, the heat rays radiated from the user's body may heat a gas in the bag part 4 with high efficiency to enhance heat retention of the air mat.

In addition, even though the gas injecting check valve 5 is manufactured by heat-fusing two films 5a for the valve on inner sides of the first film 2 and the second film 3, a check valve having a structure in which one film for a valve or three films for a valve are heat-fused on an inner side or a check valve having a structure in which a passage for the check valve, which is thin and bent, is formed by heat-fusing the first film 2 and the second film 3 without using the film for a valve can be formed at an end portion of the gas cushioning material 1.

A periphery between the first film 2 and the second film 3 is heat-fused by the heat-sealing to form the heat-fusion line 18 and the gas introducing passage 8 is formed at an upper portion in a horizontal direction. An end portion of the gas introducing passage 8 is opened and acts as an inlet 9, and a nozzle of a gas pump is inserted into the inlet 9 to inject the gas.

In addition, the gas injecting check valve 5 is formed between the gas introducing passage 8 and each gas cell row 6 of the bag part 4 formed below the gas introducing passage 8 and this gas injecting check valve extends across a heat-fusion boundary line 16. The gas injecting check valve 5 is composed of two films 5a for a valve and vertically extends across a heat-fusion boundary line 16 in the insides of the first film 2 and the second film 3. In the state in which the gas injecting check valve 5 injects the gas into the corresponding gas cell row 6 of the bag part 4, a back flow of the gas caused by an internal gas pressure in the gas cell row is prevented and the gas pressure in the gas cell row 6 is maintained.

In the gas injecting check valve 5 composed of two films 5a for the valve, the films 5a overlap each other and an area between the films is partially heat-fused by a plurality of heat-fusion lines, a narrowed thin valve passage is formed between the films, the gas is injected into the gas cell row 6 of the bag part 4 through the valve passage so that when the gas cell row 6 is expanded, the films 5a of the valve passage are in contact with each other by the gas pressure to prevent a back flow of the gas.

At an end portion of the gas cushioning material 1, in other words, at an end portion opposite to the end portion at which the gas injecting check valve 5 is formed, the discharge valve part 11 is formed along a lower end of each gas cell row 6. This discharge valve part 11 is the valve for discharging the gas in the gas cell row 6 of the bag part 4 and has a structure in which an area between the first film 2 and the second film 3 is heat-fused by a heat-fusion line 17 for narrowness to form a narrowed discharge passage 12 through which the gas in each gas cell row 6 is discharged.

By bending the discharge valve part 11 by 360° in the transverse direction of the narrowed discharge passage 12, the discharge passage 12 is closed, and by unbending the discharge valve part, the discharge passage 12 is opened to open the discharge valve part 11. In addition, when the discharge valve part 11 is bent and the discharge passage is closed, a first surface fastener 13 is coupled to a second surface fastener 14 to maintain a closed state of the discharge passage 12.

A loop-shaped nap is formed on any one of the first surface fastener 13 and the second surface fastener 14 and a hook-shaped nap is formed on the other one. However, it is possible to form both the loop-shaped nap and the hook-shaped nap on each of the surface fasteners. Due to the above structure, the surface fasteners can be repeatedly coupled to and separated from each other to provide excellent water-resistance, oil resistance and an antifouling property.

Figure 6:
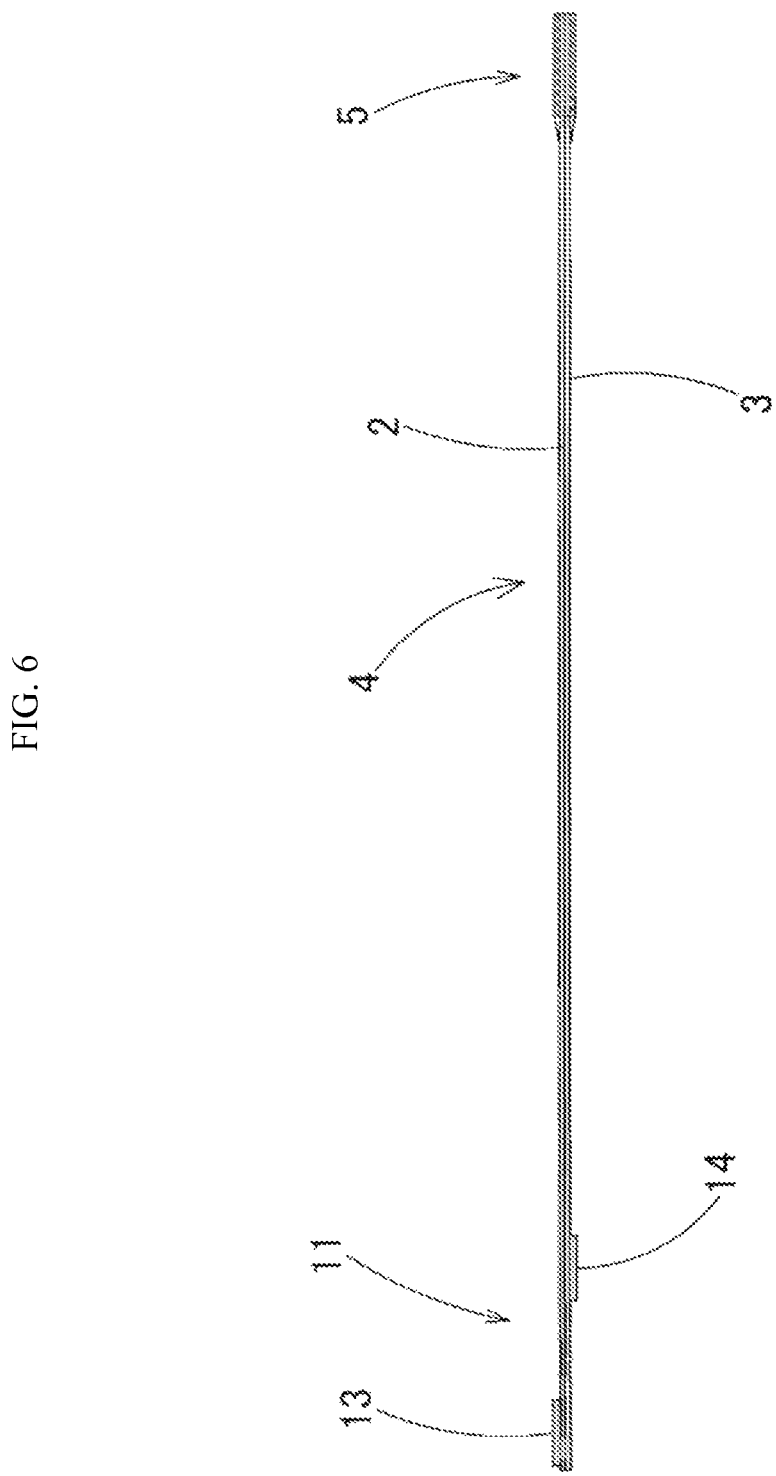
FIG. 6 is a side view showing a state in which a discharge valve part is opened and gas is discharged from a bag part.

As shown in FIG. 6, the first surface fastener 13 is attached to an upper surface (or a lower surface) of a front end portion of the discharge valve part 11 and the second surface fastener 14 is attached to a lower surface (or an upper surface) of a portion of the discharge valve part 11, which is somewhat remote from the front end portion. In addition, the attachment of the first surface fastener 13 and the second surface fastener 14 to the discharge valve part 11 may be performed by means of an adhesive, welding or sealing.

Figure 5:
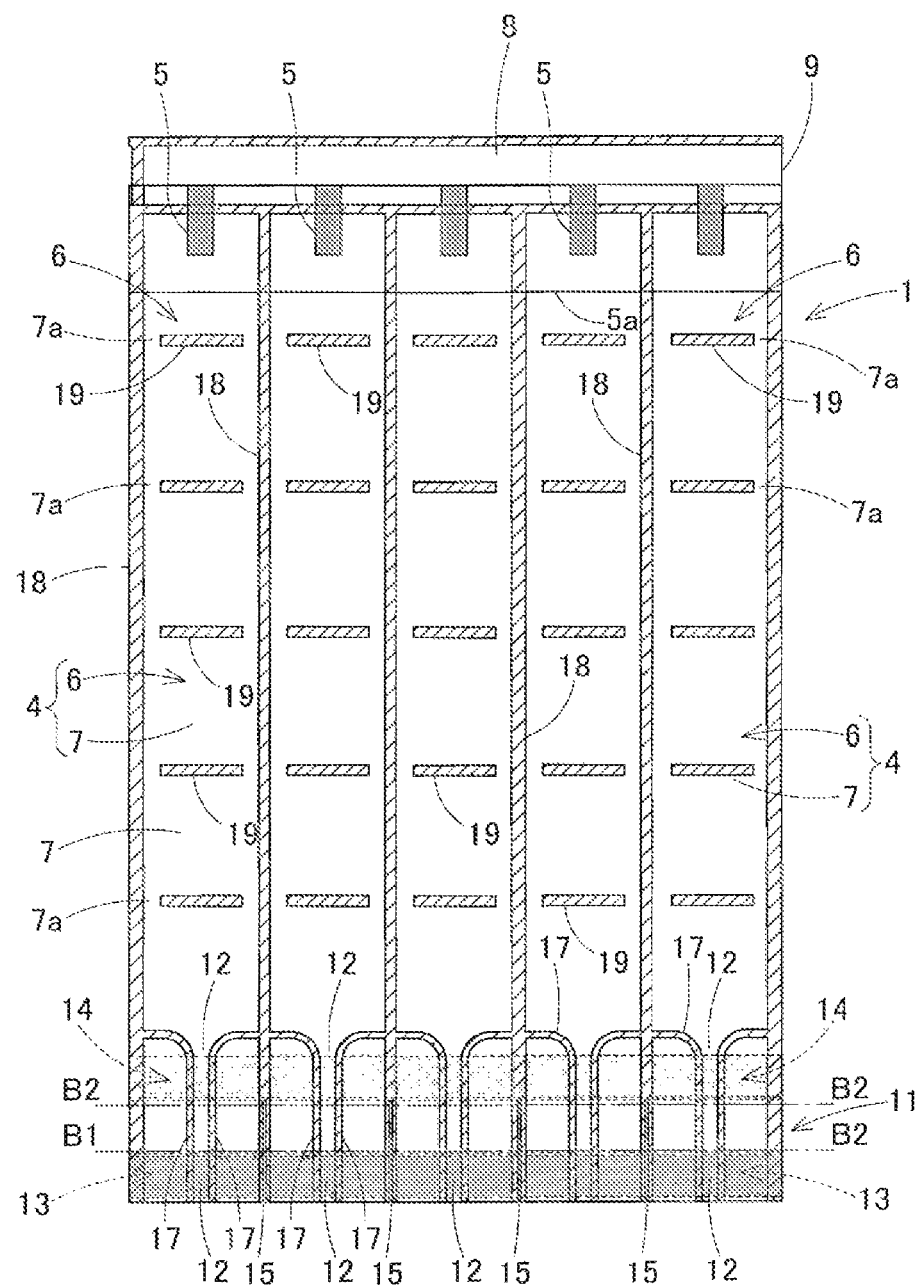
FIG. 5 is a cross-sectional view of a gas cushioning material in which a discharge valve part is opened.

As shown in FIG. 4 and FIG. 5, two bendable bending lines B1 and B2 are formed between the first surface fastener 13 and the second surface fastener 14, and when the discharge valve part 11 is bent by 360° through the two bending lines B1 and B2 (imaginary lines) across the discharge passage 12, the discharge valve part 11 is closed, and in this state, the first surface fastener 13 and the second surface fastener 14 in this state are coupled to each other to allow the bending state of the discharge valve part 11 to be maintained. Due to the above, the discharge passage 12 of the discharge valve part 11 is assuredly closed and the gas with which the gas cell row 6 is filled is maintained.

In other words, the discharge valve part 11 has the discharge passage 12 formed by fusing the films with the heat-fusion line 17 for narrowness and the discharge valve part 11 is bent by 360° with respect to the bending lines B1 and B2 across the discharge passage 12 as shown in FIG. 4 so that the narrowed discharge passage 12 is bent and closed.

In addition, the discharge valve part 11 is separately formed between the gas cell rows 6, and the first surface fastener 13 and the second surface fastener 14 of each discharge valve part 11 are separately detached so that the gas in each of the gas cell rows 6 is separately discharged.

In the discharge valve part 11, as shown in FIG. 5, a slit 15 is formed between the neighboring gas cell rows 6, and the first film 2, the second film 3, the first surface fastener 13 and the second surface fastener 14 between the films are separated by the slit 15. In each gas cell row 6, due to the above structure, the first surface fastener 13 and the second surface fastener 14 may be separately detached to open the valve and the gas in each gas cell row 6 can be discharged from the discharge valve part 11.

Due to the above structure and function, when the gas cushioning material 1 is used, in the state in which the bag part 4 is somewhat excessively filled with the gas, the user opens the discharge valve part 11 of an arbitrary gas cell row 6 to discharge the gas and may adjust the gas pressure in the gas cell row 6 until firmness or softness of the arbitrary gas cell row 6 has a desired cushion characteristic (firmness or softness). For example, when the gas cushioning material 1 is used as the air mat or the air sitting cushion, etc., there are times that the user wants to make the gas cell 7 of a central portion of the bag part 4 soft and to make the gas cell 7 adjacent to an end portion somewhat firm. In this case, due to the above structure, the user can open the discharge valve part 11 of the corresponding gas cell row 6 to discharge the gas so that it is possible to adjust the corresponding gas cell 7 for obtaining the desired firmness or softness.

Figure 1:
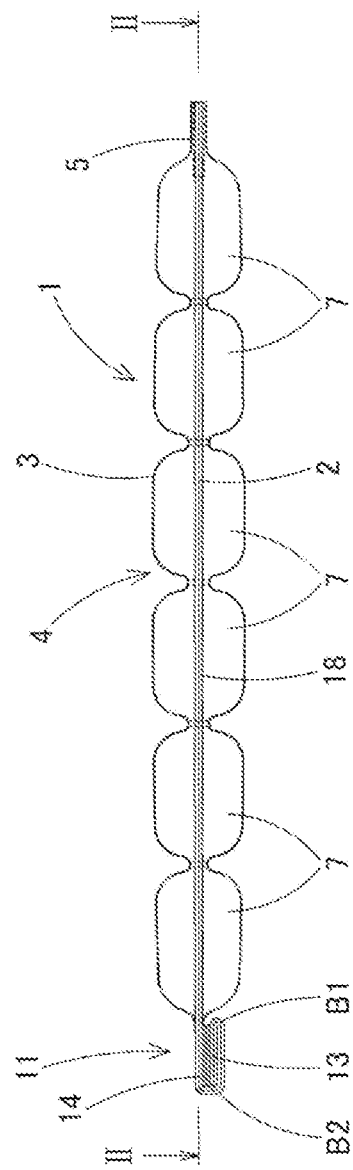
FIG. 1 is a side view of a gas cushioning material which is the first embodiment of a discharge valve device of the present invention.
Figure 2:
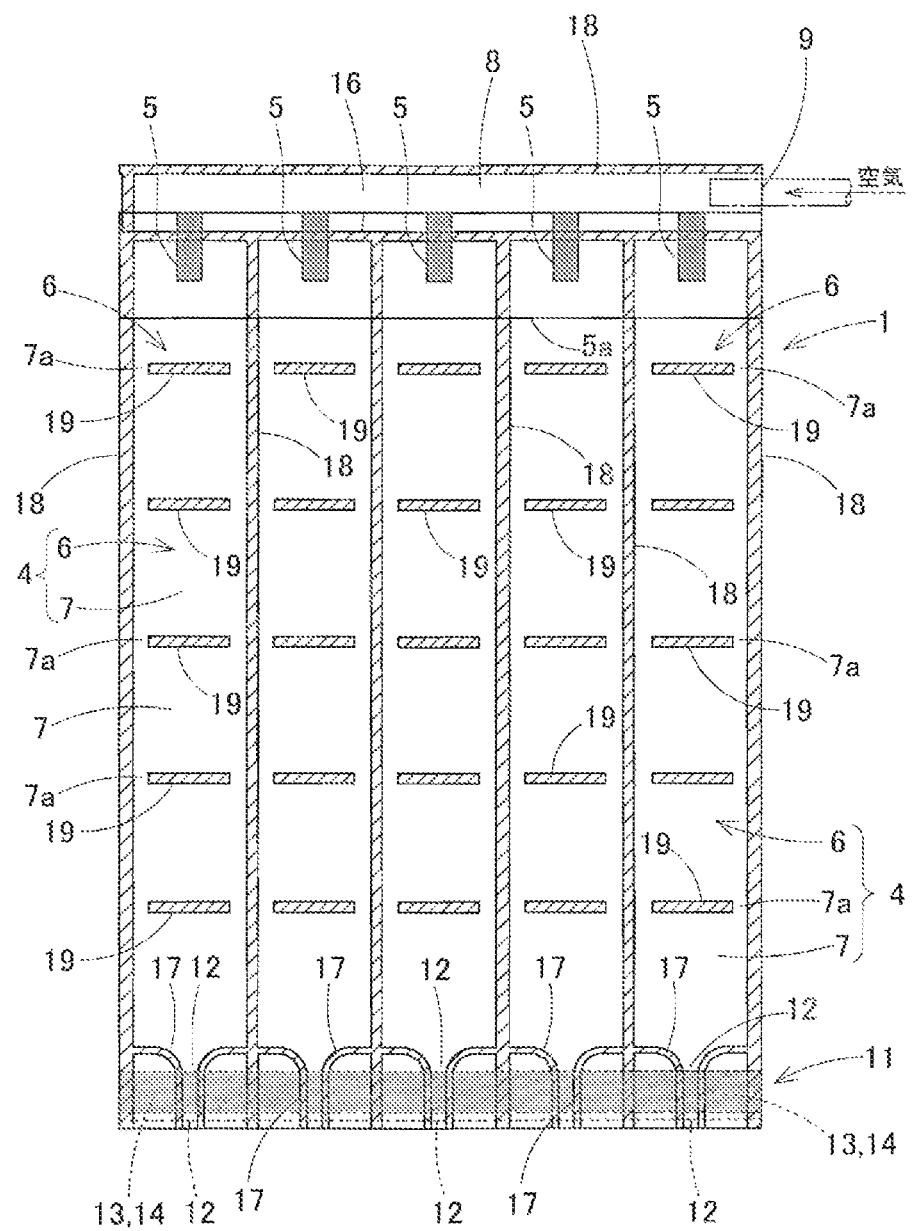
FIG. 2 is a cross-sectional view taken along the line II-II of FIG. 1 and schematically shows a gas cushioning material.

If the gas cushioning material having the above structure is used, the bag part 4 is filled with a gas, and at this time, as shown in FIG. 1, the discharge valve part 11 is bent by 360° with respect to the bending lines B1 and B2 and the first surface fastener 13 is coupled to the second surface fastener 14 to maintain the bending state of the discharge valve part and close the discharge passage 12. In this state, a nozzle of a gas injecting device such as a small gas pump is inserted into the inlet 9 and a gas (air, nitrogen, etc.) is injected into each bag part 4 through the inlet 9, the gas introducing passage 8 and each gas injecting check valve 5 to fill the bag parts with the gas. At this time, the gas which is being injected into each cell row 6 is injected into the gas cells 7 in order through the communicating passage 7a, and when the gas cells 7 of all the gas cell rows 6 are filled with the gas with an appropriate pressure, the bag part 4 becomes the expanded state as shown in FIG. 3.

In this state, since the discharge valve part 11 was bent, the bending state is maintained by a coupling between the first surface fastener 13 and the second surface fastener 14, and the first film 2 is in contact with the second film 3 of the thin and narrowed discharge passage 12 at the bending portion, the discharge valve part 11 is completely closed and a leak of the gas does not occur. Also, in the gas injecting check valve 5, if the bag part 4 is completely filled with the gas and a gas pressure in the bag part 4 is increased, this gas pressure is applied to the gas injecting check valve 5 to perfectly block a back flow of the gas and to prevent the gas from being leaked. Therefore, the gas cushioning material 1 maintains the pressure of the gas received in the bag part 4 for a long time and may be used as the air mat, the air sitting cushion and may be used as the gas cell cushioning material for bale-packaging if it has a small size.

For example, if the gas cushioning material 1 is used as the air mat or the air sitting cushion, there are times that the user wants to make the gas cell 7 of a central portion of the bag part 4 soft and make the gas cell 7 adjacent to an end portion somewhat firm. In this case, the user fills the bag part 4 with the gas to make the bag part somewhat firm and opens the discharge valve part 11 of the gas cell row 6 placed at a central portion to discharge the gas and to adjust softness of the gas cell 7 of the gas cell row 6 placed at a central portion to have a desired degree.

Due to the above, if the gas cushioning material 1 is used as an air mat type of a Korean-style mattress when the user sleeps outdoors or is in a disaster zone, as compared with a conventional cushioning material, the usability of the gas cushioning material of the present invention is significantly increased. As shown in FIG. 3, in addition, since each gas cell row 6 is divided into a plurality of gas cells 7, the gas cells communicate with each other through the communicating passage 7a and can be easily bent via the heat-fusion part 19 formed at a boundary portion, if the user utilizes the gas cushioning material 1 as an air mat type of Korean-style mattress, the gas cell 7 is bent according to a shape of the user's body to allow the user to feel comfortable and to sleep well.

If the gas cushioning material 1 is preserved or stored after using it, the first surface fastener 13 and the second surface fastener 14 of the discharge valve part 11 are detached and spread out to open the discharge valve part 11 to allow the gas cushioning material to be returned to a flat shape before the gas cushioning material is bent. Due to the above, the discharge passage 12 becomes an open state to allow the gas in the bag part 4 to be easily discharged through the discharge passage 12 of the discharge valve part 11 and the gas cushioning material 1 to have a thin thickness and a reduced volume as shown in FIG. 6. Consequently, it is possible to fold the gas cushioning material and the gas cushioning material 1 can be stored in a very small space.

Meanwhile, when the gas cushioning material 1 is used again, as shown in FIG. 1, the discharge valve part 11 is bent by 360° with respect to the bending lines B1 and B2, the first surface fastener 13 is coupled to the second surface fastener 14, and the bending state of the discharge valve part 11 is maintained to close the discharge passage 12 of the discharge valve part 11. In this state, the nozzle of the gas injecting device is inserted into the inlet 9 and the gas is injected into each bag part 4 through the inlet 9, the gas introducing passage 8 and each gas injecting check valve 5 to fill the bag parts 4 with the gas.

If each bag part 4 is expanded so the gas pressure in the bag part is increased to a predetermined value, a back flow of the gas is prevented due to an operation of the gas injecting check valve so that the gas pressure in the bag part 4 is maintained and the gas cushioning material 1 is used again as the gas cell cushioning material for bale-packaging.

Since the first surface fastener 13 and the second surface fastener 14 used for closing the discharge valve part 11 has excellent water-resistance, oil resistance and an antifouling property and conducts a coupling performance for a long time, the user can repeatedly use the gas cushioning material 1 in a place at which the gas cushioning material becomes easily wet or contaminated.

In addition, although the above embodiment discloses that the discharge valve part 11 is bent by 360° with respect to the bending lines B1 and B2 and is then closed, a structure in which the discharge valve part can be rotated by 180° with respect to one bending line and the surface fasteners are coupled to close the valve can be employed. In this case, the first surface fastener and the second surface fastener are attached to the same surface of the discharge valve part, the discharge valve part is bent by 180° with respect to a bending line between the surface fasteners and the first surface fastener is coupled to the second surface fastener to close the valve.

FIG. 7 to FIG. 15 illustrate another embodiment of the gas cushioning material 1, this embodiment is an example in which a plurality of gas cushioning materials 1 are connected to each other through end portions thereof and employed as a large-sized gas cushioning material, a sleeping bag, an article against the cold, a simplified tent or a simplified awning.

In the discharge valve part 11 of an end portion of the gas cushioning material 1, as shown in FIG. 7, the first surface fastener 13 is attached to an upper surface (or a lower surface) of the front end portion of the discharge valve part 11 and the second surface fastener 14 is attached to a lower surface (or an upper surface) of a portion of the discharge valve part 11, which is somewhat remote from the front end portion. And, when the discharge valve part 11 is bent by 360° through two bending lines B1 and B2 across the discharge passage 12, the discharge valve part 11 is closed, and in this state, the first surface fastener 13 and the second surface fastener 14 are coupled to each other to allow the bending state of the discharge valve part 11 to be maintained.

In addition to the above, as shown in FIG. 7, a third surface fastener 21 is attached to an upper surface (opposite to the surface on which the second surface fastener 14 is attached) of the portion of the discharge valve part 11, which is somewhat remote from the front end portion. This third surface fastener 21 is provided for connecting a plurality of gas cushioning materials 1 to each other through the discharge valve part 11 thereof as shown in FIG. 8 to FIG. 11, and if the discharge valve part 11 is bent by 360° to close the valve, the third surface fastener 21 is located on the upper surface of the portion of the bent discharge valve part 11, which is somewhat remote from the front end portion.

In addition, in this case, if the third surface fastener 21 having a loop-shaped nap and a hook-shaped nap formed on a fastener surface thereof is used, even though the same type of the third surface fastener 21 is attached to another gas cushioning material 1, the gas cushioning materials 1 can be coupled to each other.

Therefore, if the user wants to use the larger-sized gas cushioning material 1, the plurality of gas cushioning materials 1 are connected such that the third surface fasteners 21 of the discharge valve parts 11 overlap each other, so that it is possible to easily enlarge and use the gas cushioning material 1 having a larger size. Also, in this case, when each gas cushioning material 1 is filled with the gas, since the gas can be injected into seven (7) gas cell rows 6 via the gas inlets 9, respectively, by means of a manual gas pump, as compared to the large-sized gas cushioning material having a plurality of gas cell rows (10 to 20 gas cell rows) to be filled with the gas, it is possible to easily fill the gas cell rows with the gas.

Figure 8:
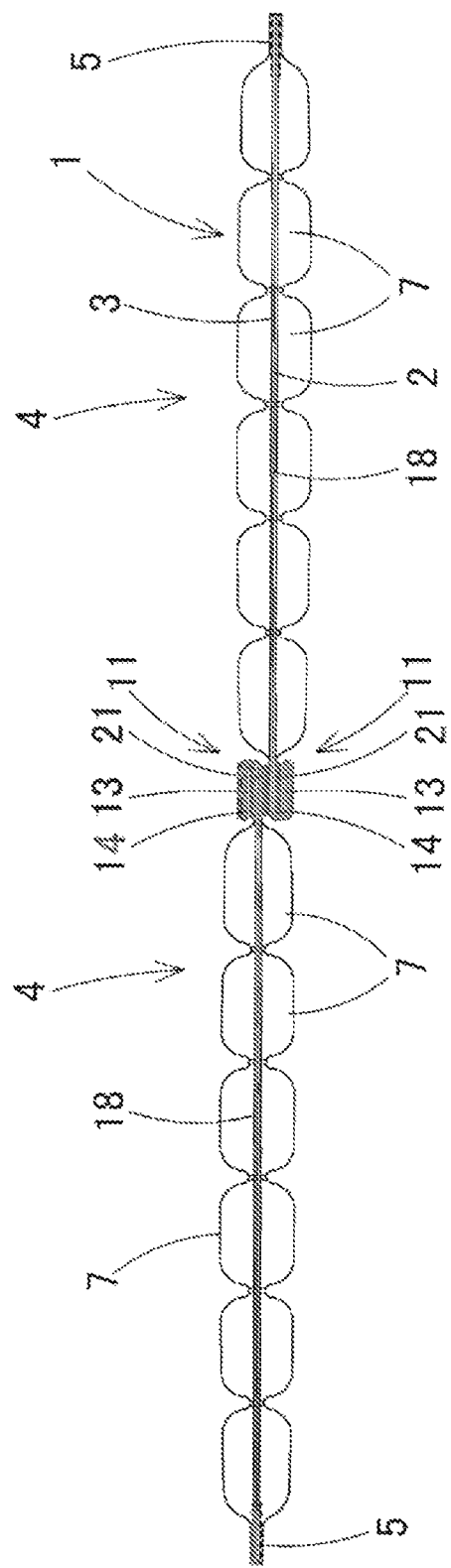
FIG. 8 is a cross-sectional view showing a state in which gas cushioning materials are connected to each other with portions of discharge valve parts thereof.
Figure 9:
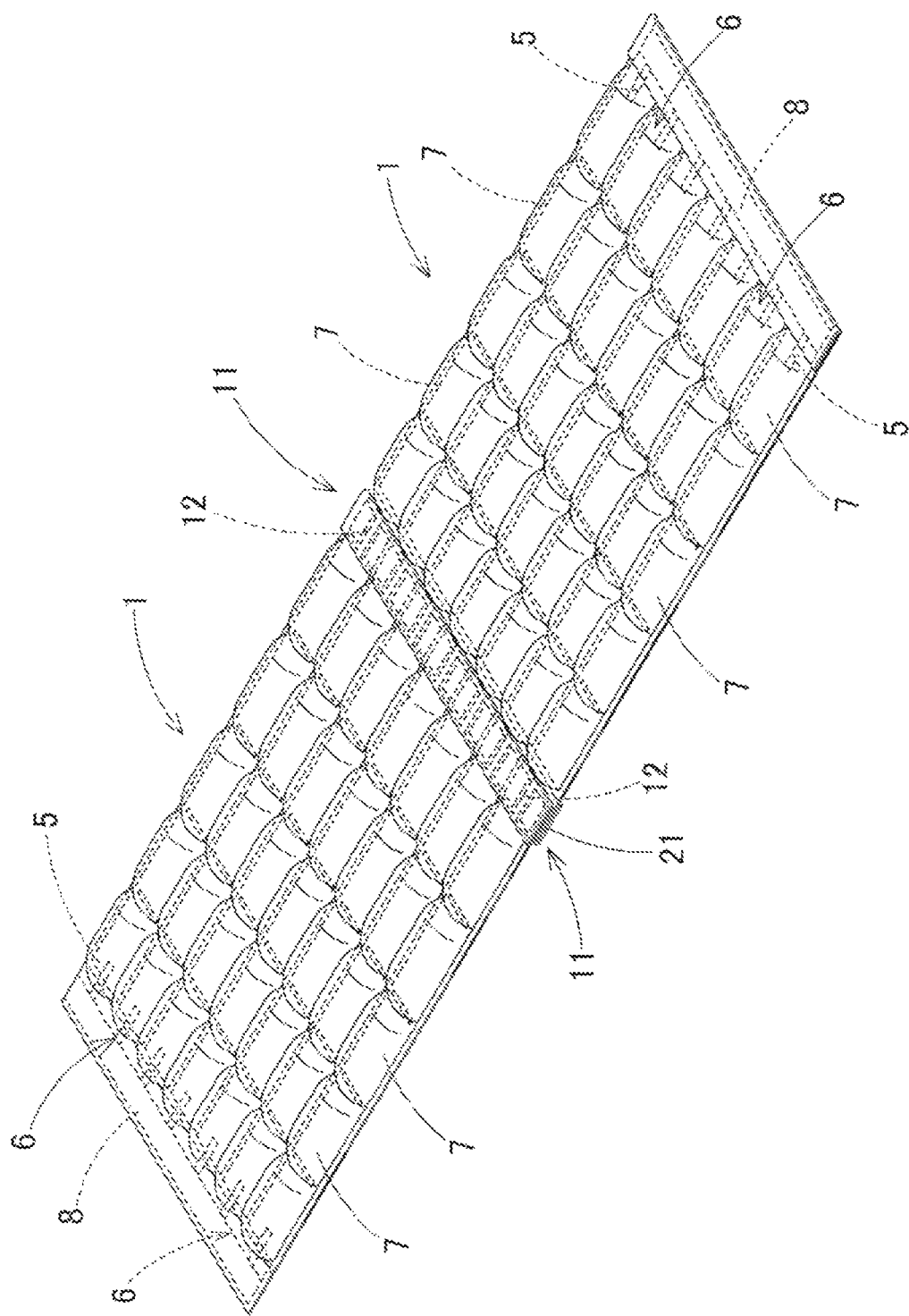
FIG. 9 is a perspective view showing a state in which gas cushioning materials are connected to each other.
Figure 10:
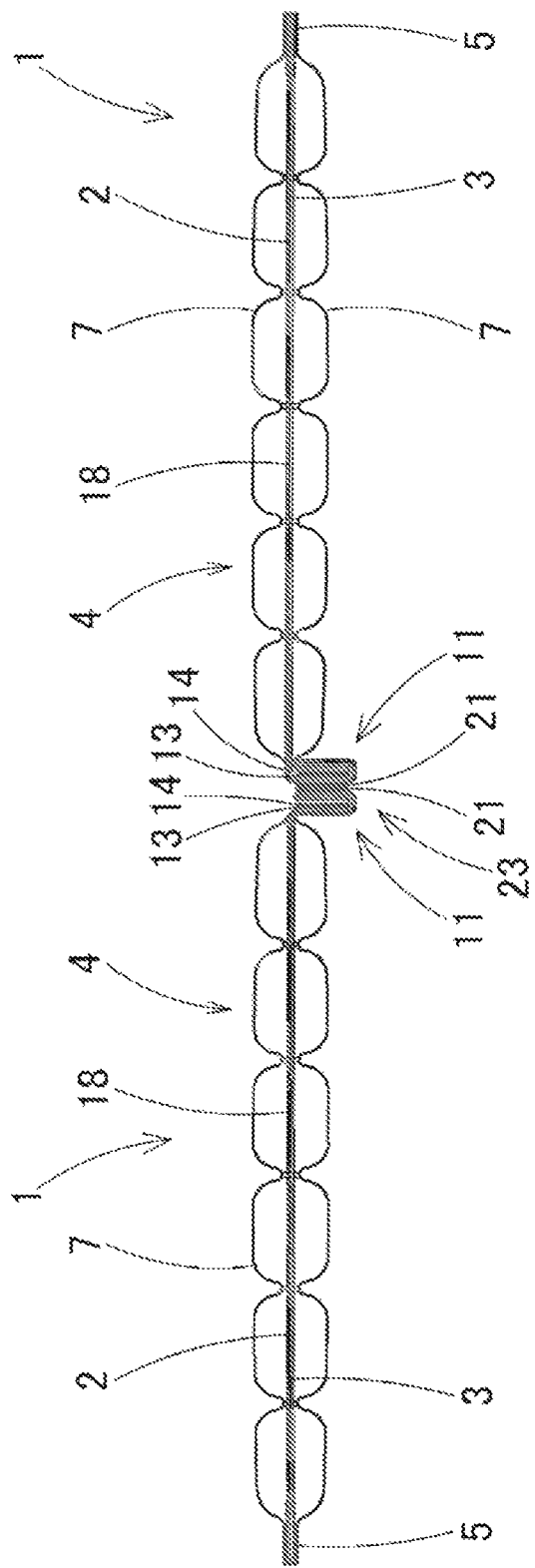
FIG. 10 is a cross-sectional view of another example in which gas cushioning materials are connected to each other with portions of discharge valve parts thereof.
Figure 11:
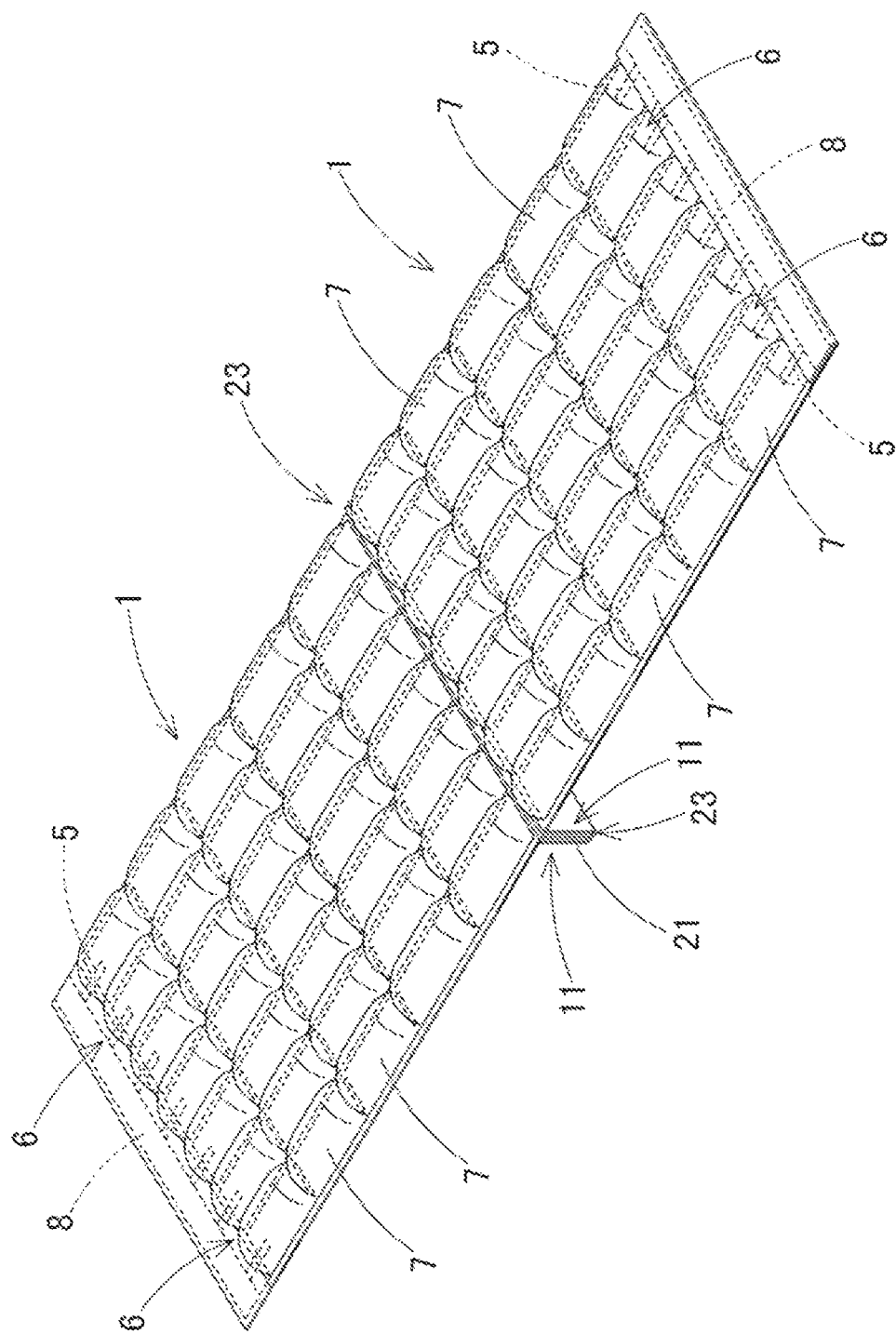
FIG. 11 is a perspective view showing a state in which gas cushioning materials are connected to each other.

As shown in FIG. 8 and FIG. 9, the third surface fasteners 21 of the gas cushioning materials 1 overlap each other, in other words, one gas cushioning material 1 is connected to another inverted gas cushioning material 1. As shown in FIG. 10 and FIG. 11, however, two gas cushioning materials 1 may be connected to each other in the state in which surfaces of the gas cushioning materials are in the same plane. In this case, as shown in FIG. 10 and FIG. 11, the third surface fasteners 21 does not face upward, but face forward (rearward) and are coupled to each other to attach the upright discharge valve parts 11 to each other and to form a connecting part 23. According to the above structure, since a thickness of the discharge valve part 11 is quite smaller than a width thereof, it is possible to reduce a connecting part 23 of the gas cushioning materials 1. In addition, when the gas cushioning material 1 is used as the air mat, etc., if the connecting part 23 faces downward, the gas cells 7 are disposed at regular intervals so that the user can use the gas cushioning materials without feeling discomfort, for example, the user lies on his/her side over the air mat, etc.

Figure 12:
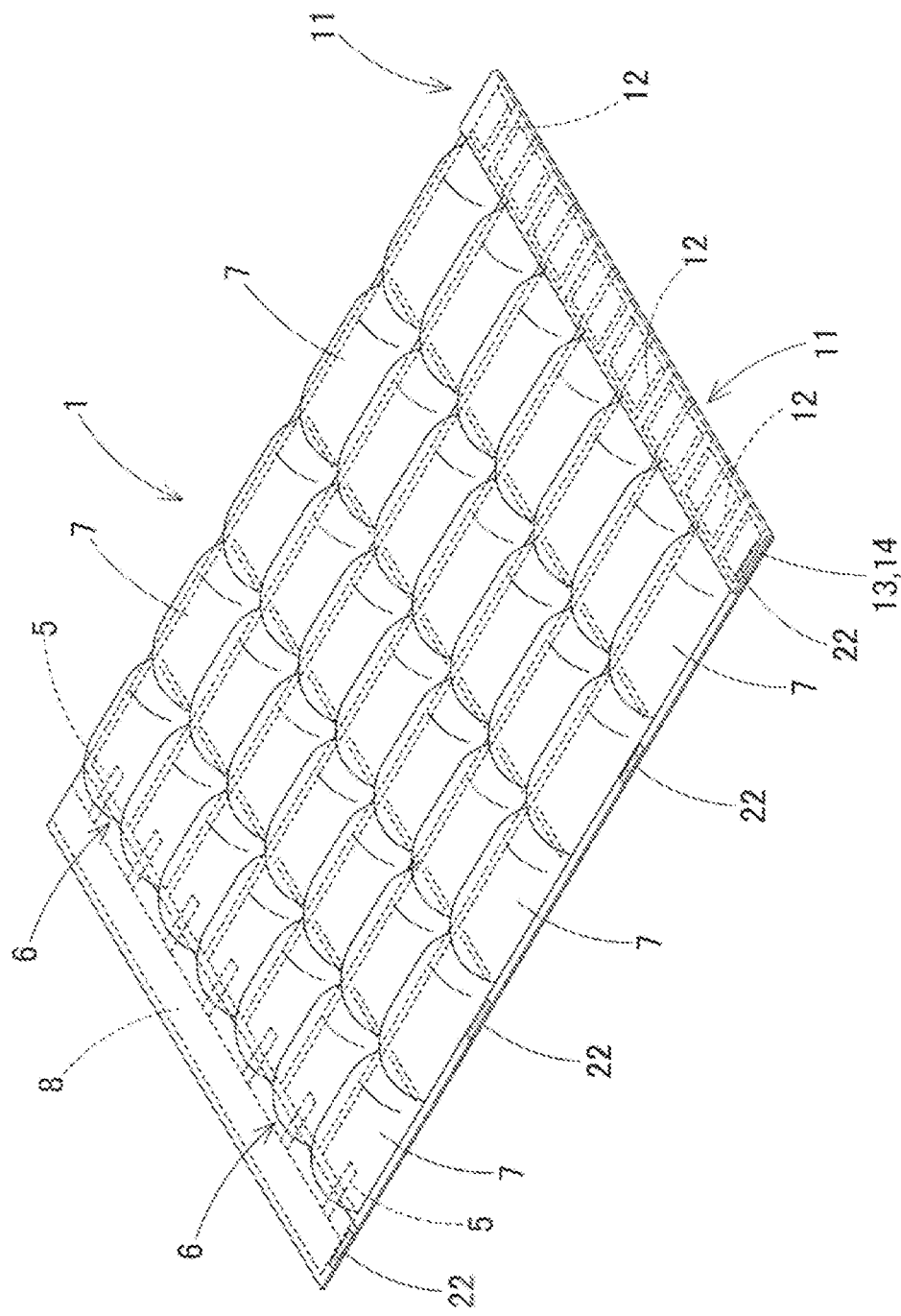
FIG. 12 is a perspective view of another embodiment of a gas cushioning material.
Figure 13:
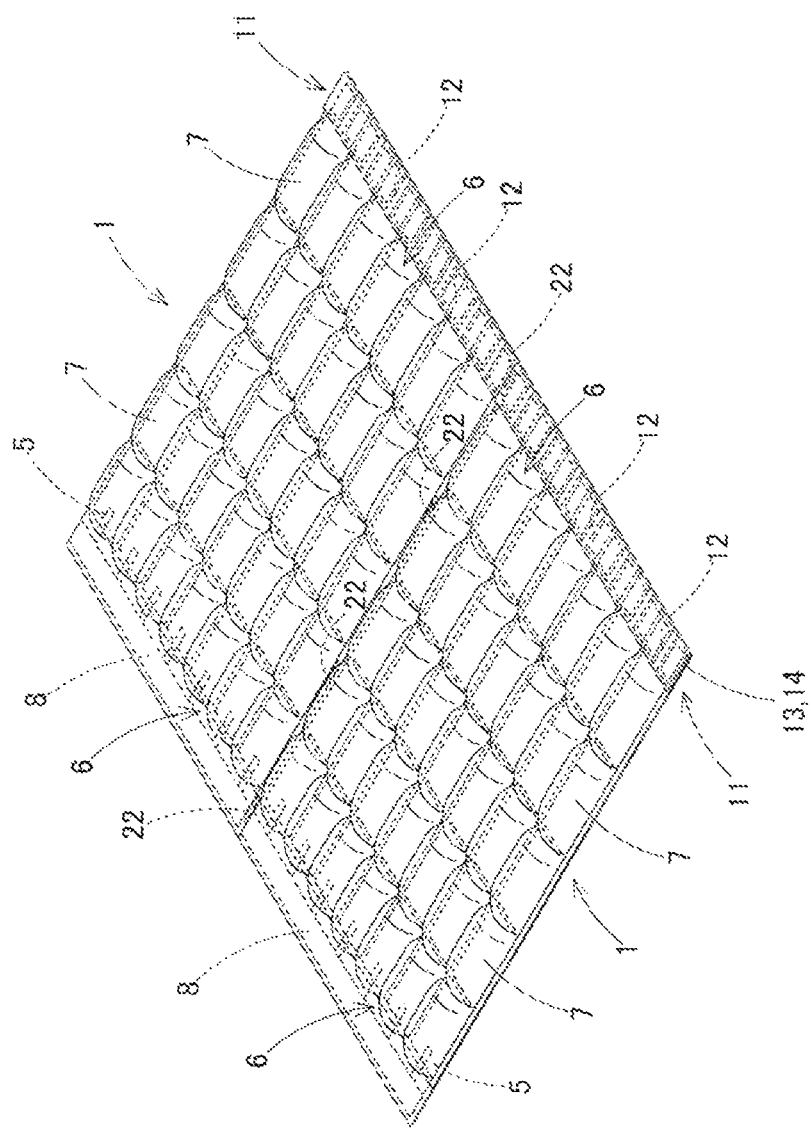
FIG. 13 is a perspective view showing a state of gas cushioning materials are connected to each at periphery thereof.

Also, as shown in FIG. 12, a fourth surface fastener 22 may be attached to a side edge portion of the gas cushioning material 1. This fourth surface fastener 22 is employed for connecting the plurality of gas cushioning materials 1 to each other via the side edge portions thereof. For example, if two gas cushioning materials 1 are coupled to each other by overlapping the fourth surface fasteners 22 attached on the side edge portion thereof, as shown in FIG. 13, the large gas cushioning material having an area twice that of the gas cushioning material can be conveniently used. In addition, the attachment of the third surface fastener 21 to the discharge valve part 11 and the attachment of the fourth surface fastener 22 to the side edge portion may be performed by means of an adhesive, welding or sealing.

If the fourth surface fasteners 22 are attached to both side edge portions of the gas cushioning material 1, three or more gas cushioning materials 1 may be connected to each other via these fourth surface fasteners 22. In this case, if the fourth surface fastener 22 having a loop-shaped nap and a hook-shaped nap formed on a fastener surface thereof is used, it is possible to connect the gas cushioning material 1 to another gas cushioning material. In addition, if the fourth surface fasteners 22 to be attached to the side edge portion of the gas cushioning material 1 are attached to both side edge portions of the gas cushioning material, three or more gas cushioning materials 1 may be connected to each other and then used.

As described above, if the square type of plate-shaped gas cushioning material 1 in which the third surface fastener 21 and the fourth surface fastener 22 are attached to three sides thereof is constructed, two gas cushioning materials 1 are arranged to overlap each other, the third surface fasteners 21 and the fourth surface fasteners 22 attached to lower sides and right and left sides are coupled to each other, and as a result, the sleeping bag or the article against the cold may be formed by two gas cushioning materials 1.

In general, the user carries the sleeping bag or the article against the cold in a knapsack and uses it on a mountain, etc. However, when the user carries the sleeping bag or the article against the cold including the gas cushioning material 1, the discharge valve part 11 is opened to discharge the gas (air) from the gas cell 7 and to significantly reduce a volume. Therefore, the user can conveniently carry the sleeping bag or the article against the cold and can easily fill the gas cushioning material with the gas (air) through the gas introducing passage 8 and the inlet 9 using an air pump on a site at which the sleeping bag or the article against the cold is used. Thus, the user can conveniently use the sleeping bag or the article against the cold.

Figure 14:
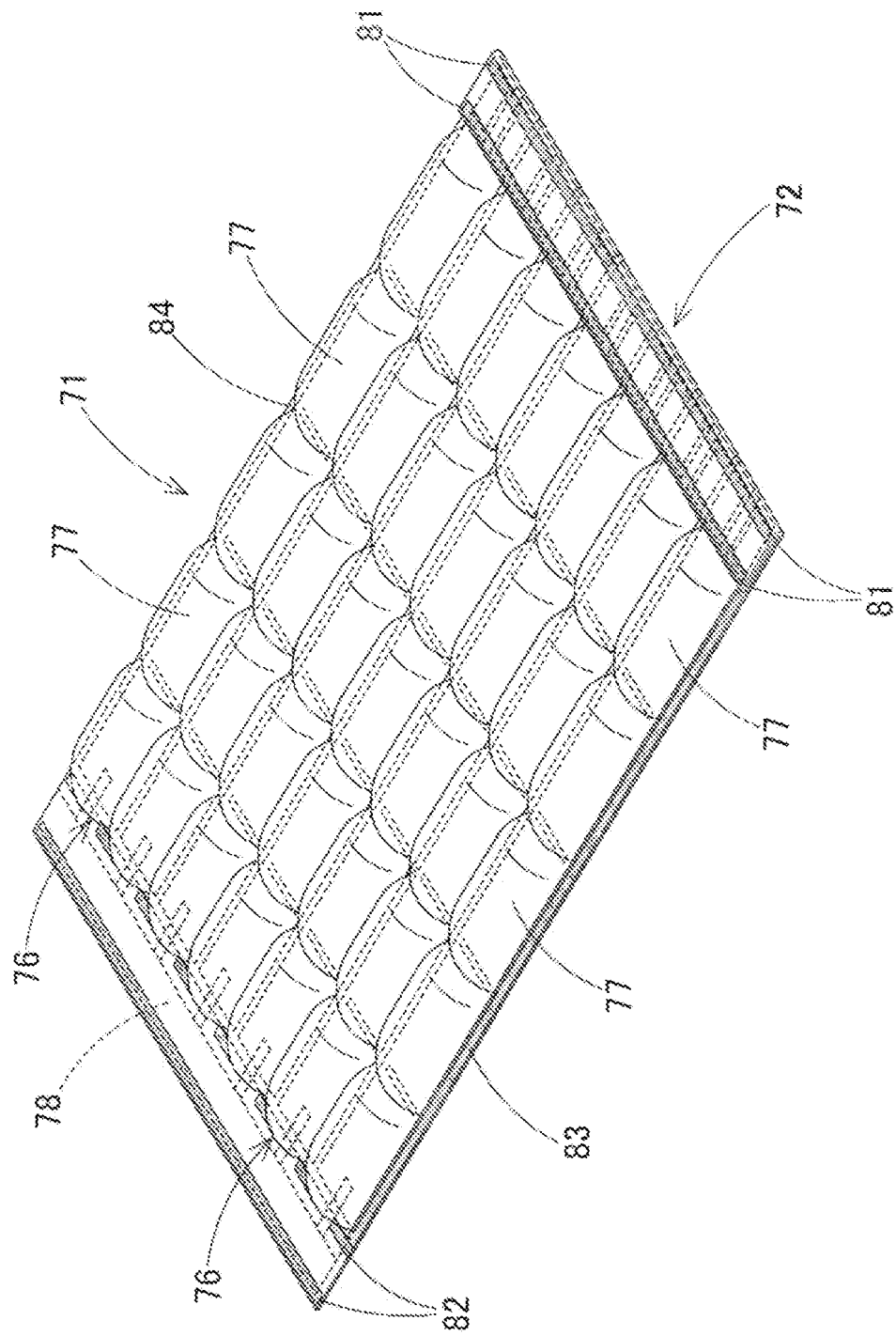
FIG. 14 is a perspective view of a gas cushioning material for a simplified tent.
Figure 15:
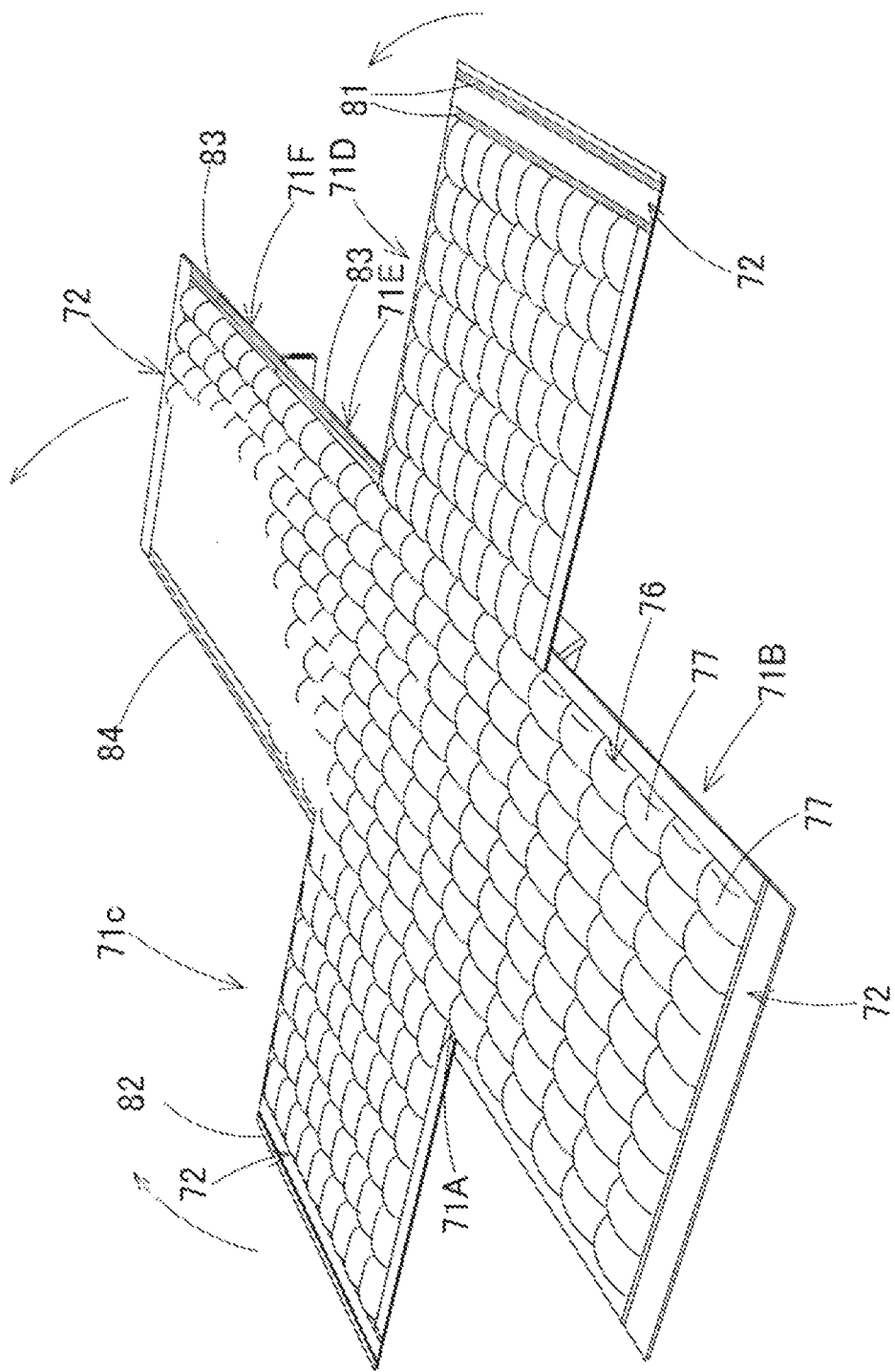
FIG. 15 is an exploded perspective view showing a state in which a simplified tent is manufactured by connecting a plurality of sheets of a gas cushioning material.
Figure 16:
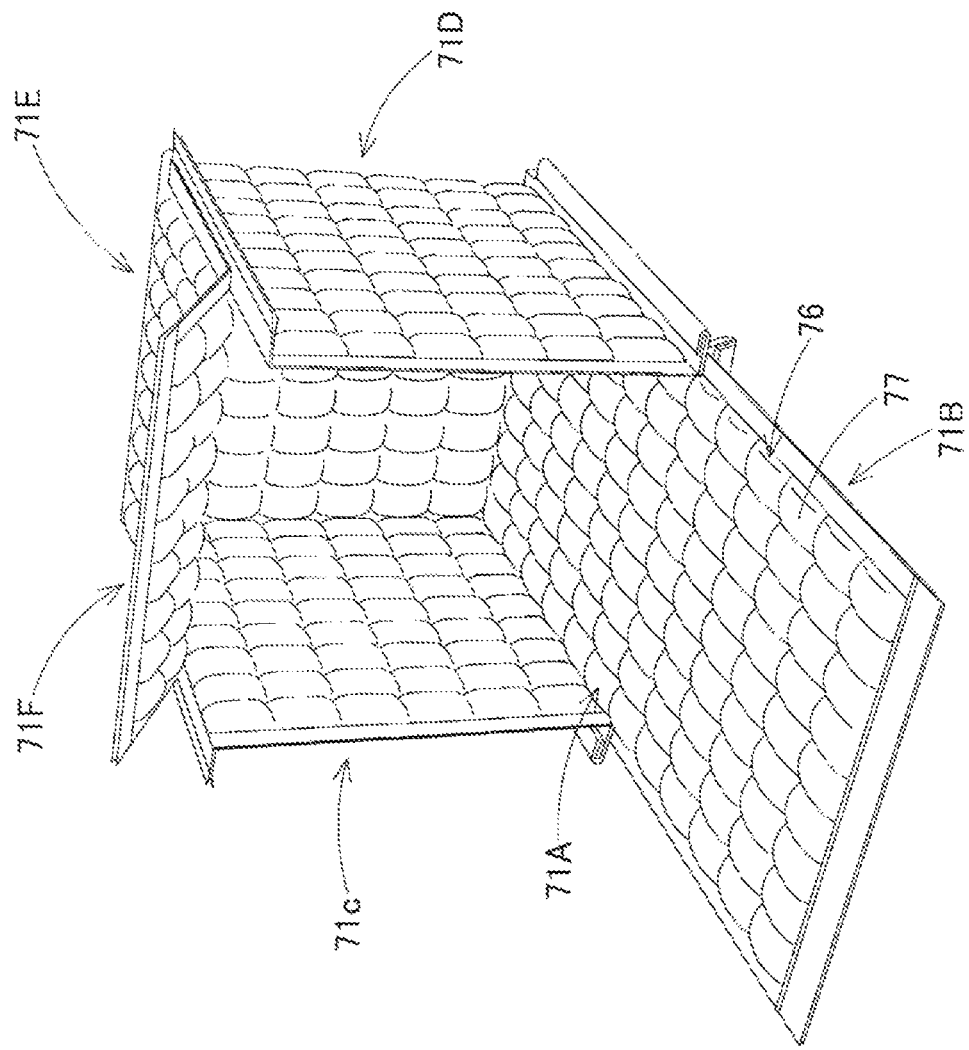
FIG. 16 is a perspective view of a simplified tent manufactured by connecting a plurality of sheets of a gas cushioning material.
Figure 17:
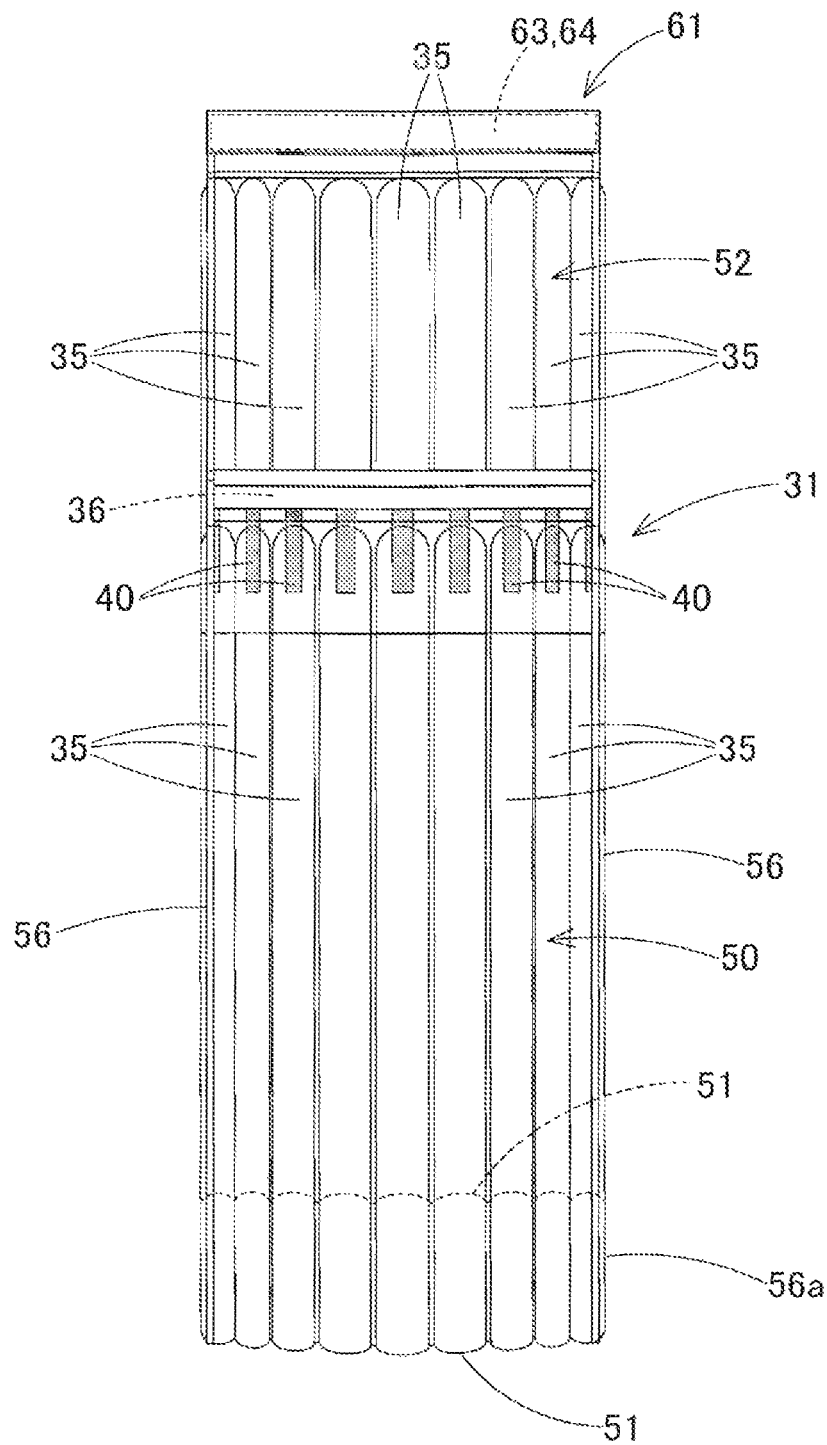
FIG. 17 is a front view of a gas cushioning material for bottles (gas cell cushioning material for bottles) according to the second embodiment.
Figure 18:
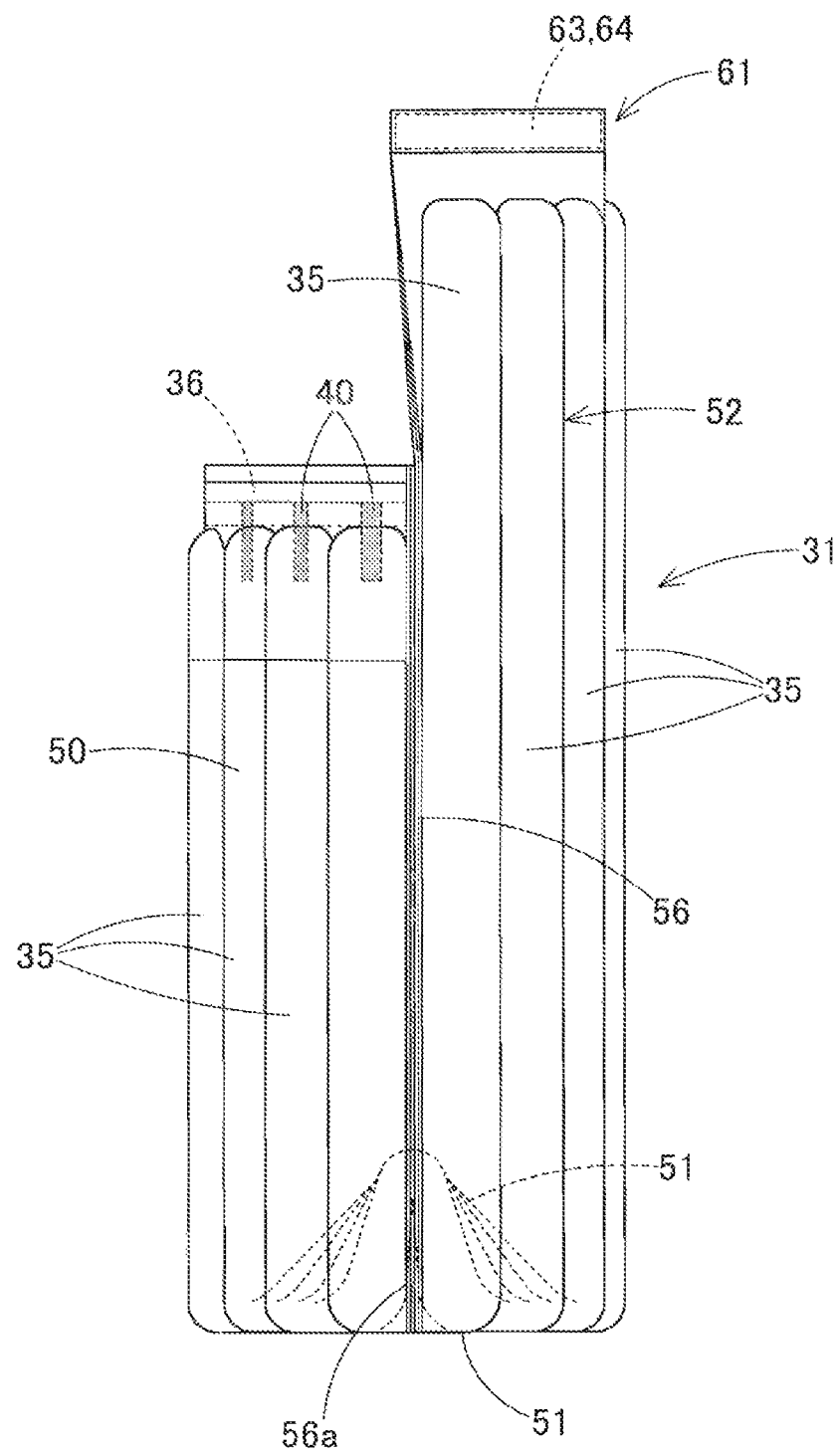
FIG. 18 is a right side view of a gas cell cushioning material for bottles.

FIG. 14 to FIG. 16 illustrate an example in which a plurality of plate-shaped gas cushioning materials 71 are connected to each other to manufacture a box-shaped simplified tent or simplified awning. Basically, the gas cushioning material 71 has a configuration which is the same as that of the gas cushioning materials 1 as described above, a fifth surface fastener 82 is attached to a surface of the gas introducing passage, and a sixth surface fastener 83 and a seventh surface fastener 84 are attached to both side edges of the gas cushioning material.

Like the gas cushioning material 1 as described above, in the gas cushioning material 71 as shown in FIG. 14, a first film and a second film, which are cut into a rectangular shape and have a predetermined size, overlap each other and linear-shaped heat-fusion lines are formed at peripheral portions and at predetermined locations of inner areas of the films by heat-sealing to form a plurality of gas cell rows 76 of a bag part in a longitudinal direction. Heat-fusion parts are formed in each gas cell row 76 in the transverse direction at a predetermined interval. Due to the above, the gas cell row is divided into the plurality of gas cells 77. Communicating passages, which are non-fused portions, are formed at both end portions of the heat-fusion part. An aluminum deposition film obtained by depositing aluminum may be employed as at least one of the first film and the second film constituting the gas cushioning material 71. In this case, since the aluminum deposition film serves to block cold air or heat or reflect heat rays, according to a season or a temperature at which the simplified tent or the simplified awning is used, the gas cushioning material can used in a state in which the aluminum deposition surface is selectively arranged as an inner side or an outer side.

On one end portion of the bag part, a gas introducing passage 78, which communicates with the gas cell row via the gas injecting check valve, is formed in a transverse direction, and the gas injected through the gas introducing passage 78 is introduced into the gas cell row 76 from the gas injecting check valve and is then injected into the gas cells 77 in order via the communicating passage. On the other end portion of the bag part, which is opposite to the end portion on which the gas injecting part (the gas introducing passage) is formed, a discharge valve part 72 is formed and communicates with each gas cell row 76 through a narrowed discharge passage.

The discharge valve part 72 formed at the other end portion is bent by 360° in the traverse direction of the narrowed discharge passage to close the discharge passage and is spread out to open the valve. In addition, when the discharge valve part 72 is bent and the discharge passage is closed, a first surface fastener and a second surface fastener are coupled to an upper surface and a lower surface of the discharge valve part 72 to maintain a closed state of the discharge passage, like the example described with reference to FIG. 7.

In addition, a third surface fastener 81 is attached to a surface of the discharge valve part 72, the fifth surface fastener 82 is attached to a surface of an end portion of the gas introducing passage 78, and the sixth surface fastener 83 and the seventh surface fastener 84 are continuously attached to edges of both sides of the bag part in the longitudinal direction of the edge. The third surface fastener 81, the fifth surface fastener 82, the sixth surface fastener 83 and the seventh surface fastener 84 are provided for connecting a plurality of gas cushioning materials 71 via each side portion, and the simplified tent as shown in FIG. 15 and FIG. 16 can be assembled by connecting the optional numbers of the cushioning materials 71 to a predetermined locations.

In order to assemble the simplified tent, as shown in the exploded view of FIG. 15, one gas cushioning material 71A acting as a floor is placed, the third surface fastener 81 or the fifth surface fastener 82 attached to an edge of a rear surface of the door gas cushioning material 71B is coupled to the third surface fastener 81 attached to an edge of a front surface of the bottom gas cushioning material 71A to mount the door gas cushioning material to the bottom gas cushioning material. In addition, the sixth surface fastener 83 and the seventh surface fastener 84 of right and left side wall gas cushioning materials 71C and 71D are coupled to the third surface fastener 81 of the bottom gas cushioning material to mount right and left side gas cushioning materials 71C and 71D to both side edges of the bottom gas cushioning material 71A. Long gas cells 77A are formed in parallel with the longitudinal direction on the side wall gas cushioning materials 71C and 71D.

In addition, the third surface fastener 81 of a rear wall gas cushioning material 71E is coupled to the third surface fastener 81 of the bottom gas cushioning material 71A to mount the rear wall gas cushioning material 71E to an edge of a rear portion of the bottom gas cushioning material 71A. Also, the third surface fastener 81 of a ceiling gas cushioning material 71F is coupled to the third surface fastener 81 of the rear wall gas cushioning material 71E to mount the ceiling gas cushioning material 71F to an edge of a rear portion of the real wall gas cushioning material 71E. If a plurality of gas cushioning materials 71A to 71F as described above are connected to each other, it is preferable that the edge be bent at a right angle as shown in FIG. 10 to allow connecting parts 23 to protrude from a lower surface.

In this state, as shown in FIG. 16, the rear wall gas cushioning material 71E and both side wall gas cushioning materials 71C and 71D are bent at right angles and erected with respect to the connecting parts 23, and the sixth surface fastener 83 and the seventh surface fastener 84 of the side edges of these gas cushioning materials 71E, 71C and 71D are coupled to each other to form the box-shaped gas cushioning materials. Finally, the ceiling gas cushioning material 71F is bent forward from the rear wall gas cushioning material 71E, and the sixth surface fastener 83 and the seventh surface fastener 84 of the both side edges of the ceiling gas cushioning material are coupled to the third surface fastener 81 or the fifth surface fastener 82 of the both side wall gas cushioning materials 71C and 71D to complete the simplified tent.

When the above simplified tent manufactured by combining the plurality of gas cushioning materials described as above is transported, the discharge valve part 72 of each gas cushioning material 71 is opened to discharge the gas, and the plurality of gas cushioning materials are then folded into small dimensioned gas cushioning materials. In addition, when the simplified tent is assembled, the gas cell row 76 of each gas cushioning material 71 is filled with the gas through the gas introducing passage and the inlet using the air pump, etc. and the surface fasteners are then coupled to each other so that the simplified tent can be easily assembled.

In addition, since the bottom, the side walls and the rear wall of the simplified tent are formed of the gas cushioning materials having the shock-absorbing, heat retaining and heat insulating properties, the user can comfortably use this simplified tent. In addition, since the long gas cells 77A are formed in the longitudinal direction in each of both side wall gas cushioning materials 71C and 71D, the strength of the side walls is increased so that the strength of the entire tent can be enhanced.

Besides the simplified tent, in addition, the simplified awning, etc. may be assembled using the above gas cushioning materials. In this case, in consideration of ventilation, the bottom, both side wall and ceiling gas cushioning materials 71A, 71C, 71D, and 71F are installed into a square shape as above, and a portion of the rear wall gas cushioning material 71E is erected and both sides are then coupled to the side wall gas cushioning materials by means of the surface fasteners. In this state, an upper portion of the rear wall gas cushioning material 71E is bent downwards and an opening is formed at an upper portion so that the simplified awning having the good ventilation may be assembled.

Figure 19:
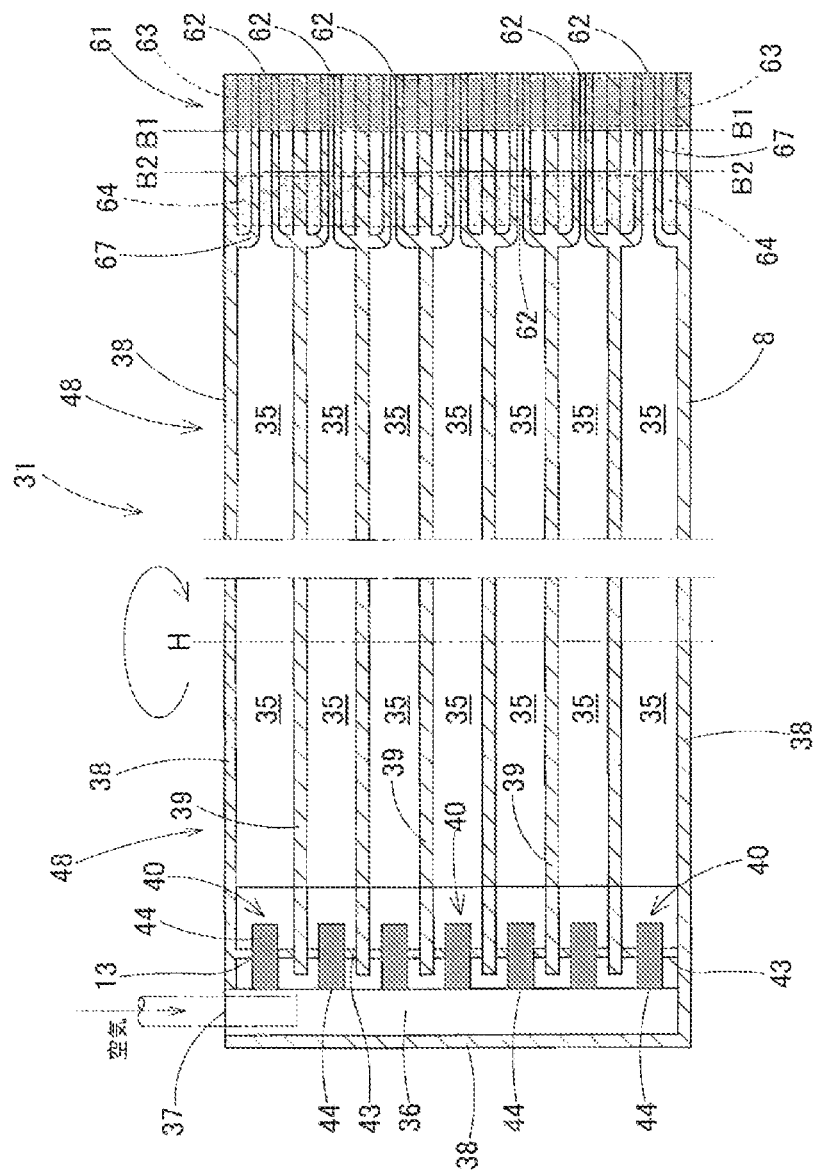
FIG. 19 is a cross-sectional view of a gas cell cushioning material for bottles.
Figure 20:
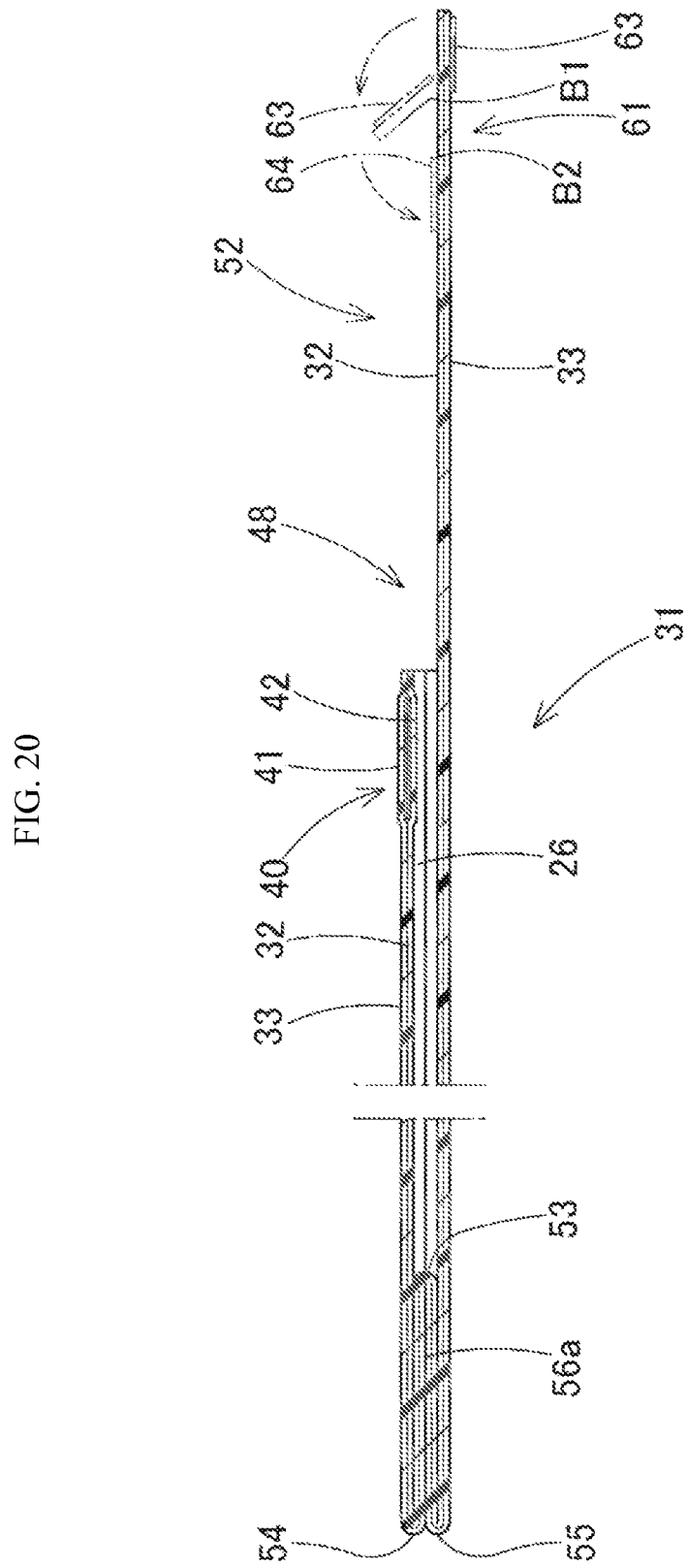
FIG. 20 is a cross-sectional view for illustrating a folding state of a gas cell cushioning material for bottles.
Figure 21:
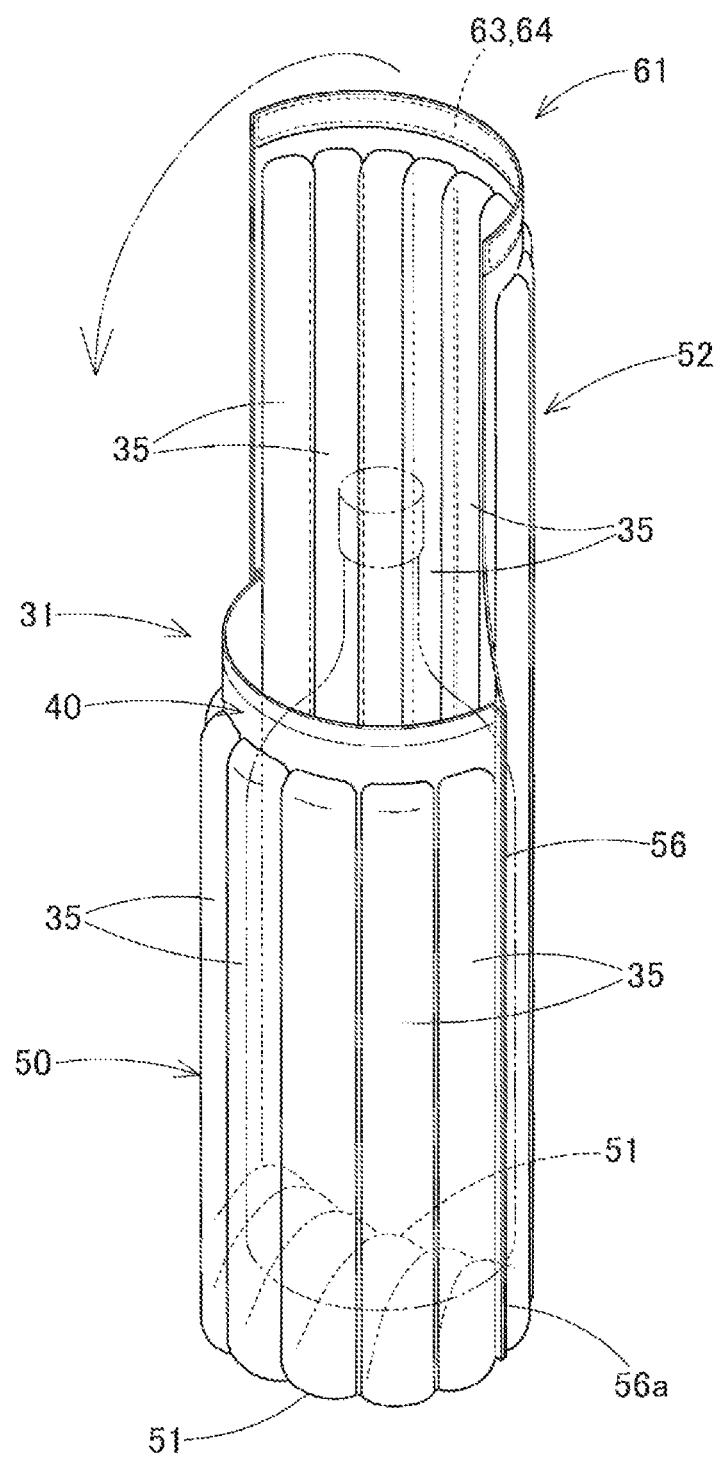
FIG. 21 is a perspective view for illustrating a gas cell cushioning material for bottles, which is in use.

FIG. 17 to FIG. 21 illustrate a gas cell cushioning material to be used as a gas cushioning material for bottles according to the second embodiment using the discharge valve device as described above. This gas cell cushioning material for the bottles is mainly utilized as gas cushioning material for the bottles when the bottles are transported. When used, a gas cell 35 is filled with the gas (air, nitrogen, etc.) to use the gas cell cushioning material as a cushioning material. After use, a discharge valve part 61 is opened to discharge the gas and to allow a compact cushioning material to be stored and used again. As shown in FIG. 21, the gas cell cushioning material is employed for packaging a bottle and has a configuration in which the bottle is inserted into a cylindrical cushioning part 50 from an upper opening of a cylindrical cushioning material main body 31, a bottom of the inserted bottle is placed on a bottom cushioning part 51, and a portion including a neck and a head of the bottle protrudes upward from an opening of the cylindrical cushioning part 50 and is placed inside of an upper cushioning part 52. In a state in which the bottle is inserted into the cylindrical cushioning part 50, the upper cushioning part 52 having a semi-circular cross-section (semi-cylindrical shape) and protruding upward is bent to cover the head of the bottle and a packing tape (adhesive tape) is wound around the bent upper cushioning part to package the head of the bottle.

When assembled, as shown in FIG. 19 and FIG. 20, a first main body film 32 and a second main body film 33 overlap each other, a pair of valve films 41 and 42 for a check valve are disposed at a location adjacent to an inner end portion of the films, and an edge of the films are heat-sealed along a heat-fusion line 38 and a heat-fusion boundary line 39 or a fusion line for a valve is heat-sealed at a portion of the check valve 44 to form the sheet-shaped cylindrical cushioning material main body 31.

As shown in FIG. 20, the first main body film 32 and the second main body film 33 constituting the cushioning material main body 31 have an elongated rectangular shape and overlap each other, two films including a pair of valve films are heat-sealed along the heat-fusion boundary line 39 between the peripheral heat-fusion line 38 and a gas cell 35. Due to the above, a plurality (for example, seven (7)) of rod-shaped gas cells 35 are formed in parallel in the longitudinal direction in the cylindrical cushioning part 50, the bottom cushioning part 51 and the upper cushioning part 52, and the entire cushioning material main body 31 has a sheet shape and is formed as an elongated sheet 48.

In addition, an aluminum deposition film obtained by depositing aluminum may be employed as at least one of the first main body film 32 and the second main body film 33. In this case, since the aluminum deposition film serves to block cold air or heat or reflect heat rays, if the cooled bottle is received in the cushioning material main body 31 and is transported, it is possible to effectively insulate and transport the cooled bottle received in the cushioning material main body due to the aluminum deposition film. In addition, as compared to a conventional synthetic resin film, the aluminum deposition film has a high damage-resistant property so that it is possible to prevent a lowering of gas pressure in the gas cell 35 caused by a vibration or shaking during transportation of the bottle.

First of all, when the cushioning material is assembled, by using the first main body film 32, the second main body film 33 and a pair of valve films 41 and 42, which are cut to have an elongated rectangular shape, the cushioning material main body 31 is formed as the elongated sheet 48 shown in the exploded view of FIG. 19. At this time, the discharge valve part 61 is formed at an upper end portion, which is opposite to a portion at which the injecting check valve 44 is formed, of the upper cushioning part 52 of the cushioning material main body 31. The discharge valve part 61 is the valve employed for discharging the gas from the rod-shaped gas cell 35, and a narrowed discharge passage 62 is formed fusing a portion between the first film 32 and the second film 33 through a heat-fusion line 67, and the gas in each gas cell 35 is discharged through the narrowed discharge passage 62.

In addition, by bending the discharge valve part 61 by 360° in the transverse direction of the narrowed discharge passage 62, the discharge passage 62 is closed, and by spreading out the discharge valve part, the discharge passage 62 is opened to open the discharge valve part, thereby discharging the gas. In addition, when the discharge valve part 61 is bent and the discharge passage is closed, a first surface fastener 63 is coupled to a second surface fastener 64 to maintain a closed state of the discharge passage.

As shown in FIG. 19 and FIG. 20, the first surface fastener 63 is attached to an upper surface (or a lower surface) of a front end portion of the discharge valve part 61 and the second surface fastener 64 is attached to a lower surface (or an upper surface) of a portion of the discharge valve part 61, which is somewhat remote from the front end portion. As shown in FIG. 19 and FIG. 20, two bendable bending lines B1 and B2 are formed between the first surface fastener 63 and the second surface fastener 64, and when the discharge valve part 61 is bent by 360° through two bending lines B1 and B2 across the discharge passage 62, the discharge valve part 61 is closed, and the first surface fastener 63 and the second surface fastener 64 in this state are coupled to each other to allow the bending state of the discharge valve part 61 to be maintained. Due to the above, the discharge passage 62 of the discharge valve part 61 is assuredly closed and the gas with which each gas cell row is filled is maintained.

A bottom portion of the cushioning material main body 31 is placed inside and bent as shown in FIG. 20. Then, a cylindrical heat-fusion part 56 and a bottom heat-fusion part 56a, which will become both side edges of the cushioning material main body are heat-sealed to heat-fuse the periphery. And, in use, by filling the gas cell 35 of the cylindrical cushioning part 50, the bottom cushioning part 51 and the upper cushioning part 52 with the gas as shown in FIG. 20, the cylindrical cushioning part 50 is expanded and has a cylindrical shape, the bottom cushioning part 51 rises from an inner side of the bottom in a convex shape, and the upper cushioning part 52 protrudes above the cylindrical cushioning part 50.

When the gas cell cushioning material for the bottle is assembled as described above, the first main body film 32 and the second main body film 33 overlap each other, the first and second main body films are heat-fused along the heat-fusion line 38 at an outer edge and the heat-fusion boundary line 39 at a midsection, and the elongated gas cell 35 is formed in parallel with the longitudinal direction. As shown in FIG. 19, however, one gas injection passage 36 having a gas inlet 37 is formed at a front end portion of each gas cell 35 of the cushioning material main body 31. The gas inlet 37 is formed by opening a front end portion of the gas injection passage 36 and provided for injecting the gas. The gas injection passage 36 is formed in the direction across the end portion of the cushioning material main body 31 or perpendicular to the gas cell 35 and the gas from the gas injection passage 36 is injected into each gas cell 35 through the check valve 44.

As shown in FIG. 19, the check valve 44 made of the film is formed at an end portion of each gas cell of the cushioning material main body 31 and an entry port of the check valve 44 communicates with the gas injection passage 36. Due to the above, if the nozzle of the gas pump is inserted into the gas inlet 37 and the gas is supplied to the gas inlet, the gas from the gas inlet and the gas injection passage 36 is injected into each gas cell 35 through the check valve 44.

The check valve 44 formed at an end portion of each gas cell 35 is formed by overlapping two valve films between the first main body film 32 and the second main body film 33, and heat-sealing and heat-fusing a portion between the films with a fusion line 43 for the valve. At this time, by applying a heat-resistant ink, non-fused portion acting as a valve passage is formed across a valve fusion line 43. By this non-fused portion, a narrow valve passage acting as the check valve 44 for each gas cell 35 is formed between the valve films 41 and 42. In the check valve 44, when the gas from the gas injection passage 36 is injected into the gas cell 35 through the valve passage and the gas cell 35 is expanded to a predetermined size, the valve films 41 and 42 of the valve passage are in close contact with each other by the internal gas pressure to prevent of a back flow of the gas and fill the gas cell 35 with the gas.

When assembled, as shown in FIG. 19, the elongated sheet 48 of the cushioning material main body 31 formed into the elongated rectangular sheet shape is bent with respect to a bending line H which is extended in the transverse direction of the gas cell 35 and is somewhat biased from a central point to the gas injection passage 36 side so that the gas cell 35 is folded. This bending line H is then bent in the reverse direction so that the bending line is put inside of the cylindrical cushioning part 50 and becomes a first bending portion 53 as shown in FIG. 20.

In other words, as shown in FIG. 20, the elongated sheet 48 of the cushioning material main body 31 is folded into two parts with respect to the bending line H, and the bending line H placed at an end is put inside the sheet. As a result, the initial bending line H is bent in the reverse direction so that the first bending portion 53 is formed there. The bending line is bent inwards to allow a bottom of the cushioning material main body 31 to have a convex shape, and a second bending portion 54 and a third bending portion 55 are formed at both sides of the first bending portion 53 of the bottom of the cushioning material main body 31.

In the bending process for the elongated sheet 48 of the cushioning material main body 31, a central portion of the gas cell 35 is bent to exactly overlap both side edges of the elongated sheet 48, and, in this state, the cylindrical heat-fusion parts 56 of both side edges are heat-sealed to heat-fuse the edges. Due to the heat-fusion of both side edges, the cylindrical heat-fusion parts 56, which are the final heat-fusion lines, are formed at both side edges of the cylindrical cushioning part 50 of the cushioning material main body 31, and the edge of all the films overlapping as the bottom heat-fusion part 56a is fused to both side edges of the bottom cushioning part 51.

Since a bottom of the cushioning material main body 31 has the bottom cushioning part 51 formed by bending the gas cells 35 inward, the heat-fusion line does not appear outside, the gas cells 35 which are in a bent state appear on a bottom so that the gas cells 35 covers all the bottom when bent.

If the gas cell cushioning material for the bottles is used, the gas cell 35 of the cushioning material main body 31 which is folded in the shape of a sheet is filled with the gas and expanded. At this time, the discharge valve part 61 placed at an upper portion is bent by 360° with respect to the bending lines B1 and B2 across the discharge passage 62, and the first surface fastener 63 is coupled to the second surface fastener 64 to make the discharge valve part 61 become a closed state. And, a nozzle of a gas injecting device such as a gas pump is inserted into the inlet 37 and the gas (air, nitrogen, etc.) is injected into each gas cell 35 through the inlet 37, the gas injection passage 36 and the check valve 44 to fill the gas cell with the gas.

If each gas cell 35 of the cushioning material main body 31 is expanded by injecting the gas, in particular, together with an expansion of the gas cells 35 of the bottom cushioning part 51, the force by which the gas cells 35 of the bottom which are bent inward is returned to a flat state, and both side edges of the cylindrical cushioning part 50 are fused to the cylindrical heat-fusion part 56 and the bottom heat-fusion part 56a and restricted. Due to the above, the gas cells 35 around the cylindrical cushioning part 50 are expanded to open an inside of the cylindrical cushioning part 50 and the cylindrical cushioning part 50 becomes a cylindrical shape due to an injection of the gas.

Due to the above, in the gas cell cushioning material for the bottles, which is filled with the gas with appropriate pressure, as shown in FIG. 21, since the cylindrical cushioning part 50 becomes a cylindrical shape, the upper cushioning part 52 has a semi-cylindrical shape with a semi-circular cross section, and the bottom cushioning part 51 has both side edges restricted by the bottom heat-fusion part 56a, the gas cells 35 on the bottom are maintained in the appropriate convex shape in which an inner portion of the bottom is bent and the entire cushioning material main body 31 has an approximately cylindrical shape as shown in FIG. 21. In addition, since the edge of the entire overlapping films is fused to the bottom heat-fusion parts 56a placed at both sides of the bottom cushioning part 51, the convex shape of the bottom heat-fusion part 56a is exactly maintained and although a weight of the bottle is applied to the bottom heat-fusion part 56a, the bottom cushioning part 51 does not flatten.

If the gas cell cushioning material is preserved or stored after use, the first surface fastener 63 and the second surface fastener 64 of the discharge valve part 61 are detached, the bent discharge valve part 61 is opened so that the discharge valve part is returned to the flat state which is the state prior to bending. Due to the above, the discharge passage 62 is opened, the gas is discharged from the gas cell 35 through the discharge passage 62 of the discharge valve part 61 and the gas cell becomes thin and has a reduced volume as shown in FIG. 20. As a result, it is possible to fold the gas cell cushioning material. Therefore, the gas cell cushioning material for the bottles can be stored in an extreme small space, when using it again, the discharge valve part 61 is bent to couple the surface fastener 63 and the second surface fastener 64 and to close the valve, and the gas cell cushioning material gas cell is then filled with the gas supplied through the inlet.

In the gas cell cushioning material for the bottles, in addition, if the surface fastener is attached to a periphery of the cylindrical heat-fusion part 56, a plurality of gas cell cushioning materials for the bottles, which are disposed in parallel, can be connected to each other through the surface fastener of the periphery of the cylindrical heat-fusion part 56, and can be stably transported in the state in which a plurality of gas cell cushioning materials for the bottles are connected to each other.

According to the discharge valve device of the present invention, the discharge valve part is bent to block the flow of the gas cell and the discharge valve part is opened so that the gas can be easily discharged.

In addition, according to the gas cushioning material, when stored after used, the gas is conveniently discharged through the discharge valve part to preserve the gas cushioning material, and when used again, the discharge valve part is bent, the discharge passage of the discharge valve part is closed by the surface fastener, and the gas cushioning material can be filled with the gas again to conveniently use it again.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:
1. A gas cushioning material, comprising:
a bag part formed of a film, the bag part having heat fusion lines defining a plurality of gas cell rows in parallel in the bag part, each gas cell row comprising a plurality of gas cells in a longitudinal direction of said each gas cell row, wherein the plurality of gas cells in each gas cell row communicate with each other through a communicating passage;
a gas introducing passage for introducing gas to the bag part, the gas introducing passage formed at one end of the bag part;
a plurality of gas injecting check valves through which the introduced gas from the gas introducing passage flows to the plurality of gas cell rows, each of the plurality of gas injecting check valves connected to each gas cell row, wherein each of the gas cell rows is able to be filled with the gas introduced from the gas introducing passage through each gas injecting check valve;

a discharge valve part for discharging the gas from the gas cell rows, the discharge valve part formed at the other end of the bag part, the discharge valve part having a narrowed discharge passage, the discharge valve part having a first surface fastener and a second surface fastener, the first surface fastener attached to an edge of one surface of the discharge valve part, the second surface fastener attached to a part of the other surface opposite to said one surface of the discharge valve part, wherein the discharge valve part is in one of a bent state or an open state;

when the discharge valve part is in a bent state, the discharge valve part is bent twice to make the first surface fastener be in contact with the second surface fastener so that the narrowed passage is blocked; and when the discharge valve part is in an open state, the discharge valve part is not bent so that the narrowed passage is opened.

2. The gas cushioning material of claim 1, wherein a slit formed between the gas cell rows to divide the discharge valve part so that each divided part of the discharge valve part is formed along each gas cell row, and each divided part of the discharge valve part has the first surface fastener and the second surface fastener.

3. The gas cushioning material of claim 1, wherein the gas cushioning material comprises a first cushioning material and a second cushioning material;

the first cushioning material and the second cushioning material each has a third surface fastener formed on said one surface of the discharge valve part, and the third surface fastener is spaced apart from the first surface fastener; and the first cushioning material and the second cushioning material are connected to each other by the third surface fasteners of the first cushioning material and the second cushioning material.

4. The gas cushioning material of claim 1, wherein the gas cushioning material comprises a third cushioning material and a fourth cushioning material;

the third cushioning material and the fourth cushioning material each has a fourth surface fastener attached to a side edge of the bag part; and the third cushioning material and the fourth cushioning material are connected to each other by the fourth surface fasteners of the third cushioning material and the fourth cushioning material.

* * * * *